United States Patent
Mishra

(10) Patent No.: US 11,371,877 B1
(45) Date of Patent: Jun. 28, 2022

(54) VIBRATION AMPLIFICATION AND DETECTION DEVICE

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 17/104,591

(22) Filed: Nov. 25, 2020

(51) Int. Cl.
| | |
|---|---|
| *G01H 1/14* | (2006.01) |
| *G01H 11/06* | (2006.01) |
| *G01H 9/00* | (2006.01) |
| *G01D 5/28* | (2006.01) |
| *G01D 5/24* | (2006.01) |
| *G01N 29/14* | (2006.01) |
| *G01B 15/04* | (2006.01) |
| *G01B 7/28* | (2006.01) |
| *G01N 29/44* | (2006.01) |

(52) U.S. Cl.
CPC ............ *G01H 1/14* (2013.01); *G01D 5/24* (2013.01); *G01D 5/28* (2013.01); *G01H 9/00* (2013.01); *G01H 11/06* (2013.01); *G01N 29/14* (2013.01); *G01B 7/28* (2013.01); *G01B 15/04* (2013.01); *G01D 2205/773* (2021.05); *G01N 29/4454* (2013.01); *G01N 2291/2694* (2013.01)

(58) Field of Classification Search
CPC .... G01B 15/04; G01B 7/28; G01D 2205/773; G01D 5/24; G01D 5/28; G01H 1/14; G01H 11/06; G01M 5/0066; G01N 2291/2694; G01N 29/14; G01N 29/4454; G01P 15/032; G01P 15/097; G01P 2015/0805; G01P 2015/0822; G01P 2015/0837; G01P 2015/084; G01P 2015/0848
See application file for complete search history.

(56) References Cited

U.S. PATENT DOCUMENTS

| | | | | |
|---|---|---|---|---|
| 5,195,046 A | * | 3/1993 | Gerardi ................. | B64D 15/16 702/35 |
| 2003/0128847 A1 | * | 7/2003 | Smith ................. | H04R 19/016 381/67 |

(Continued)

FOREIGN PATENT DOCUMENTS

| | | | | |
|---|---|---|---|---|
| CA | 2384971 A1 | * | 6/2001 | ............ G01H 9/004 |
| DE | 102010029278 A1 | * | 12/2011 | ............ H02N 2/10 |

(Continued)

*Primary Examiner* — David L Singer
(74) *Attorney, Agent, or Firm* — Athorus, PLLC

(57) ABSTRACT

A vibration amplification and detection device may include a coiled diaphragm coupled to a pin that is also coupled to a substrate. The coiled diaphragm may be coupled to the pin via at least one axle and a fulcrum disc, and the vibration detection device may be coupled to a surface via the substrate. Responsive to vibration associated with or proximate the surface, the coiled diaphragm may receive and amplify the received vibration. In addition, a sensor associated with the vibration detection device may capture or detect the received and amplified vibration. Further, the detected vibration may be processed and compared with known vibrations and associated properties. Moreover, one or more actions may be instructed based on the detected vibration and associated properties.

20 Claims, 11 Drawing Sheets

(56) References Cited

U.S. PATENT DOCUMENTS

| | | | | |
|---|---|---|---|---|
| 2004/0228494 | A1* | 11/2004 | Smith | A61B 7/04 |
| | | | | 381/67 |
| 2004/0239341 | A1* | 12/2004 | Aoyagi | G01P 15/125 |
| | | | | 324/661 |
| 2005/0274184 | A1* | 12/2005 | Zerbini | G01P 15/0891 |
| | | | | 73/514.01 |
| 2012/0032286 | A1* | 2/2012 | Trusov | G01C 21/16 |
| | | | | 257/417 |
| 2012/0126831 | A1* | 5/2012 | Lee | G01H 3/00 |
| | | | | 324/639 |
| 2012/0235694 | A1* | 9/2012 | Asano | G01P 15/18 |
| | | | | 324/705 |
| 2013/0119977 | A1* | 5/2013 | Sheikman | G01B 15/00 |
| | | | | 324/207.11 |
| 2013/0320997 | A1* | 12/2013 | Whiteley | G01H 3/00 |
| | | | | 324/629 |
| 2017/0016931 | A1* | 1/2017 | Johansen | G01P 15/18 |
| 2020/0191664 | A1* | 6/2020 | Fiorillo | B06B 1/0688 |

FOREIGN PATENT DOCUMENTS

| | | | | |
|---|---|---|---|---|
| EP | 1748287 A1 * | 1/2007 | | G01H 11/06 |
| WO | WO-2015133903 A1 * | 9/2015 | | G01P 15/125 |

* cited by examiner

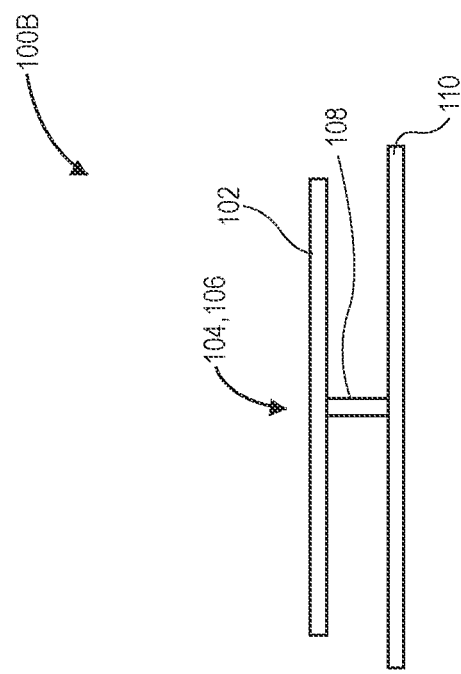
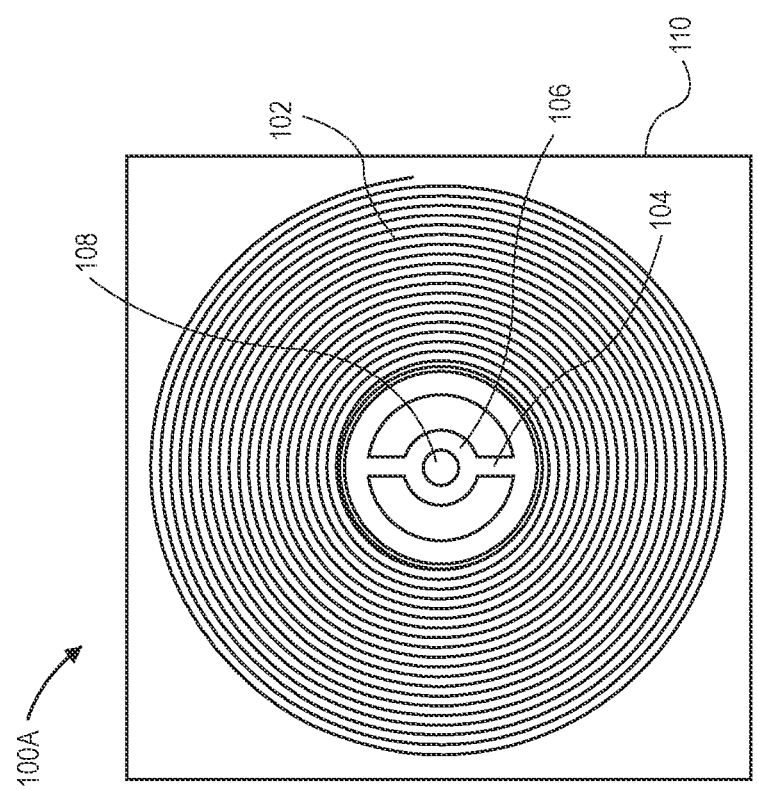

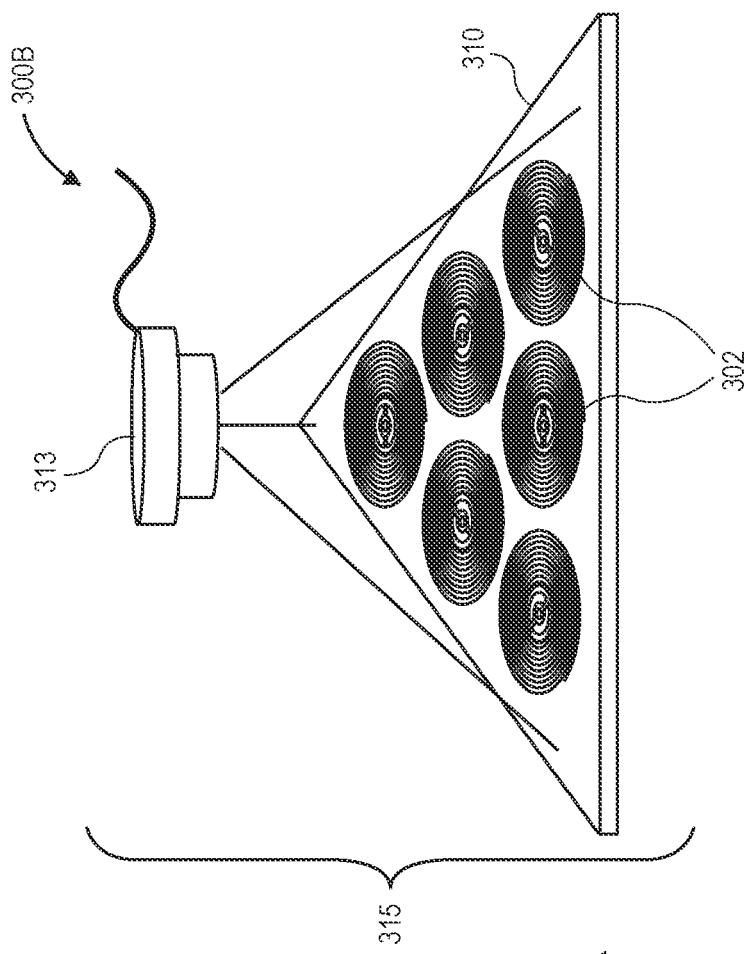
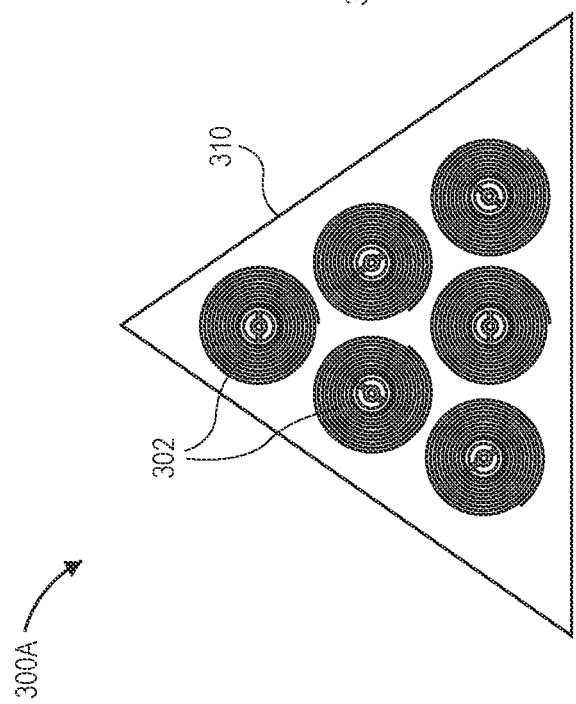
FIG. 3B
FIG. 3A

VIBRATION AMPLIFICATION AND DETECTION DEVICE

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. While there are many beneficial uses of these vehicles, measuring and understanding forces, accelerations, and vibrations experienced by various components of the vehicles may be difficult. Such forces, accelerations, and vibrations during operation may adversely affect the structure, components, control systems, operations, or other aspects of UAVs. Accordingly, there is a need for systems and methods to accurately and reliably measure or detect such forces, accelerations, and vibrations during various UAV operations.

BRIEF DESCRIPTION OF THE DRAWINGS

FIG. 1A is a schematic, overhead view diagram of a first example embodiment of a vibration amplification and detection device, in accordance with implementations of the present disclosure.

FIG. 1B is a schematic, side view diagram of a first example embodiment of a vibration amplification and detection device, in accordance with implementations of the present disclosure.

FIG. 3A is a schematic, overhead view diagram of a third example embodiment of a vibration amplification and detection device, in accordance with implementations of the present disclosure.

FIG. 3B is a schematic, side perspective view diagram of a third example embodiment of a vibration amplification and detection device, in accordance with implementations of the present disclosure.

DETAILED DESCRIPTION

Figure 2B:
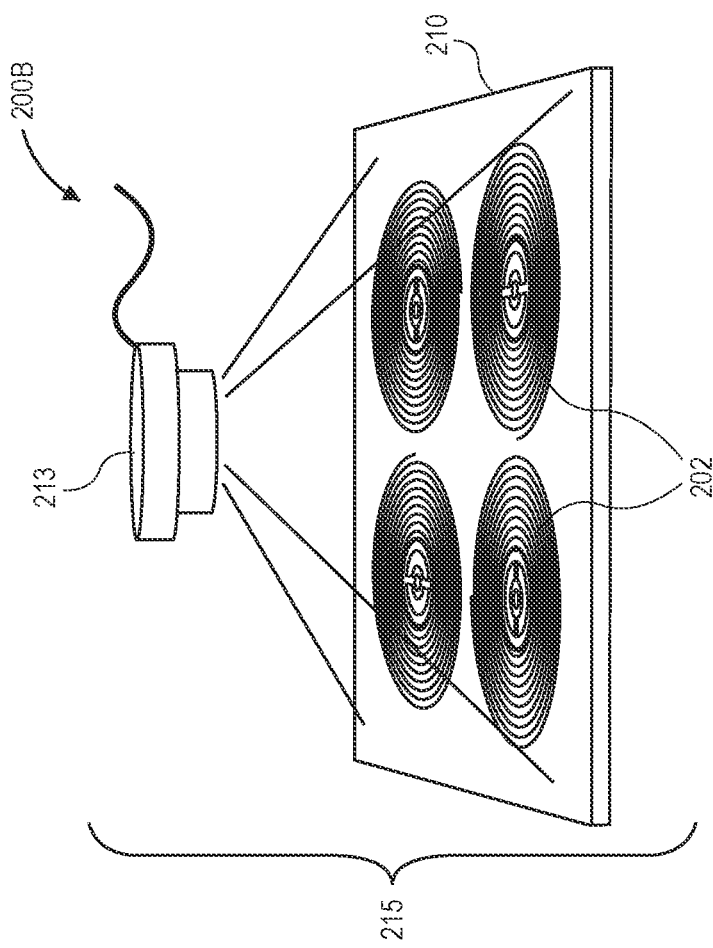
FIG. 2B is a schematic, side perspective view diagram of a second example embodiment of a vibration amplification and detection device, in accordance with implementations of the present disclosure.

As is set forth in greater detail below, implementations of the present disclosure are directed to vibration amplification and detection systems and methods using coiled diaphragms. In example embodiments, the vibration amplification and detection systems and devices described herein may be used to detect or measure vibrations and associated properties of portions of vehicles, systems, machines, equipment, or other devices, which data may be processed or analyzed to facilitate design, manufacturing, assembly, operational, service, maintenance, repair, or other processes. In other example embodiments, the vibration amplification and detection systems and devices described herein may be used to detect or measure vibrations and associated properties of or proximate to surfaces of various objects, which data may be processed or analyzed to cause, instruct, or command one or more functions or operations of various connected systems, devices, or other objects.

For example, a vibration amplification and detection device may comprise a flat, coiled diaphragm that is coupled to a substrate via a pin. In addition, the diaphragm may be coupled to the pin via a fulcrum disc and at least one axle, and the substrate may be positioned on and/or coupled to a surface of an object. The diaphragm may comprise a relatively tightly wound coil of material having a substantially flat, disc-like shape. Further, responsive to detected vibration, portions of the coiled diaphragm may be configured to move or vibrate relative to other portions. Moreover, one or more sensors may be associated with the vibration detection device and configured to capture, detect, or measure movement or vibration of portions of the coiled diaphragm.

In example embodiments, vibration associated with and/or proximate the surface on which the vibration detection device is positioned may be transferred to the coiled diaphragm via the substrate, pin, fulcrum disc, and/or axle. Then, portions of the coiled diaphragm may move or vibrate responsive to the detected vibration. The relative movement or vibration of portions of the coiled diaphragm may comprise an amplification of the vibration associated with and/or proximate the surface. Further, the one or more sensors associated with the vibration detection device may capture, detect, or measure the relative movement or vibration of portions of the coiled diaphragm.

Based on the vibration detected by the vibration detection device, one or more outputs may be instructed or commanded related to the surface, the object, and/or one or more other systems, devices, or objects. In example embodiments, based on vibration associated with a surface of a portion of an unmanned aerial vehicle, e.g., a wing, a fuselage, or other portion of the vehicle, one or more design, manufacturing, assembly, operational, service, maintenance, repair, or other processes associated with the vehicle may be instructed or commanded. In other example embodiments, based on vibration associated with or proximate a surface of a portion of an object, one or more operations or functions of a connected system, device, or object may be instructed or commanded. For example, physical input, touch commands, and/or voice commands may be detected by the vibration detection device, and one or more operations or functions of a connected device, e.g., a television, a smart home device, a connected appliance, a voice-activated device, or other connected device, may be instructed or commanded.

Although the description herein generally relates to detecting vibrations associated with unmanned aerial vehicles, the vibration detection devices described herein may be utilized with various other types of vehicles, systems, machines, equipment, or other devices to capture, detect, or measure vibrations associated with portions of such objects. Further, although the description herein generally also relates to detecting vibrations associated with particular objects within a home or residence in order to instruct or command various functions or operations of connected devices, the vibration detection devices described herein may be also be utilized with various other types of connected devices in various types of environments, such as door entry keypads or devices, access control devices, control interfaces, touch interfaces, voice-activated devices, security cameras or devices, other computing devices, or other types of connected devices that may be associated with a residence, office, store, business, warehouse, vehicle, system, machine, equipment, appliance, or other type of environment.

FIG. 1A is a schematic, overhead view diagram 100A of a first example embodiment of a vibration amplification and detection device, in accordance with implementations of the present disclosure. FIG. 1B is a schematic, side view diagram 100B of a first example embodiment of a vibration amplification and detection device, in accordance with implementations of the present disclosure.

As shown in FIGS. 1A and 1B, a vibration amplification and detection device may comprise a coiled diaphragm 102, an axle 104, a fulcrum disc 106, a pin 108, and a substrate 110. The vibration amplification and detection device, which may also be referred to herein as a vibration detection device, may be positioned on a surface of an object to capture, detect, and measure vibration associated with the surface, e.g., physical vibration of the surface of the object, and/or vibration proximate the surface, e.g., airborne vibration near the surface of the object or within the environment around the object.

The coiled diaphragm 102 may be formed as a substantially flat disc, and the diaphragm 102 may have a substantially circular shape. For example, the diaphragm 102 may comprise a thin wire, strip, or filament of material that is formed as a tightly wound coil into a substantially flat disc. The thin material of the diaphragm 102 may be coiled in order to maintain the substantially flat disc shape in the absence of applied or external forces, accelerations, or vibration. However, the thin material of the diaphragm 102 may be coiled such that portions of the diaphragm 102 may move or vibrate relative to other portions of the diaphragm 102. Accordingly, the thin material of the diaphragm 102 may generally be rigid, strong, and lightweight enough to substantially maintain the shape of the coiled diaphragm 102, while also being flexible, compliant, or resilient enough to receive and amplify applied or external forces, accelerations, or vibration. For example, portions of the diaphragm 102 may move or vibrate relative to other portions of the diaphragm 102 to amplify waves, sinusoids, or other waveforms associated with applied or external forces, accelerations, or vibration.

The coiled diaphragm 102 may have a thickness of approximately 0.4 mm. In addition, the coiled diaphragm 102 may have a diameter or width between approximately 1.0 cm to approximately 2.0 cm. In other example embodiments, the coiled diaphragm 102 may have other thicknesses, diameters, widths, or other dimensions. The thin wire, strip, or filament of material of the diaphragm 102 may be formed of various types of metals, composites, carbon fiber, plastics, thermoplastics, polymers, 3-D printing filaments or materials, other materials, and/or combinations thereof. In one example embodiment, the thin material of the diaphragm 102 may comprise carbon fiber-infused polylactic acid (PLA) or acrylonitrile butadiene styrene (ABS).

The axle 104 may be formed as a substantially straight or linear beam, rod, or pin to which the coiled diaphragm 102 is coupled. The axle 104 may be positioned substantially at a center of the coiled diaphragm 102, and a length or axis of the axle 104 may extend substantially within a same plane as the substantially flat disc shape of the diaphragm 102. In addition, the axle 104 may transmit applied or external forces, accelerations, or vibration to the diaphragm 102. Based on an orientation of the axle 104 relative to the diaphragm 102, some portions of the diaphragm 102 may move or vibrate relatively more than other portions of the diaphragm 102 responsive to applied or external forces, accelerations, or vibration. For example, portions of the diaphragm 102 that are positioned substantially orthogonally to a length or axis of the axle 104 may move or vibrate relatively more than portions of the diaphragm 102 that are positioned substantially along or parallel to a length or axis of the axle 104.

The axle 104 may have a thickness similar to the thickness of the coiled diaphragm 102. In addition, the axle 104 may have a length between approximately 0.25 cm to approximately 0.5 cm. In other example embodiments, the axle 104 may have other thicknesses, lengths, or other dimensions. The material of the axle 104 may be formed of various types of metals, composites, carbon fiber, plastics, thermoplastics, polymers, 3-D printing filaments or materials, other materials, and/or combinations thereof, and may be similar to the material of the coiled diaphragm 102.

The fulcrum disc 106 may be formed as a substantially circular disc, ring, or plate to which the axle 104 is coupled. The fulcrum disc 106 may be positioned substantially at a center of the axle 104 and the coiled diaphragm 102, and a plane of the fulcrum disc 106 may extend substantially within a same plane as the substantially flat disc shape of the diaphragm 102, as well as the length or axis of the axle 104. The fulcrum disc 106 may further include an orifice, hole, or connection point configured couple to the pin 108, as further described herein. In addition, the fulcrum disc 106 may transmit applied or external forces, accelerations, or vibration to the diaphragm 102 via the axle 104.

The fulcrum disc 106 may have a thickness similar to the thicknesses of the coiled diaphragm 102 and axle 104. In addition, the fulcrum disc 106 may have a diameter between approximately 0.1 cm to approximately 0.4 cm. In other example embodiments, the fulcrum disc 106 may have other thicknesses, diameters, or other dimensions. The material of the fulcrum disc 106 may be formed of various types of metals, composites, carbon fiber, plastics, thermoplastics, polymers, 3-D printing filaments or materials, other materials, and/or combinations thereof, and may be similar to the materials of the coiled diaphragm 102 and/or axle 104.

The pin 108 may be formed as a substantially straight beam, rod, or pin to which the fulcrum disc 106 is coupled. A first end of the pin 108 may couple to the fulcrum disc 106 substantially at a center of the fulcrum disc 106, axle 104, and coiled diaphragm 102, and a length or axis of the pin 108 may extend substantially orthogonal or perpendicular to a plane associated with the substantially flat disc shape of the diaphragm 102, as shown in the side view of FIG. 1B. The first end of the pin 108 may couple to an orifice, hole, or connection point of the fulcrum disc 106. In addition, the pin 108 may transmit applied or external forces, accelerations, or vibration to the diaphragm 102 via the axle 104 and fulcrum disc 106.

The pin 108 may have a thickness similar to the thicknesses of the coiled diaphragm 102, axle 104, and fulcrum disc 106. In addition, the pin 108 may have a length between approximately 1.0 mm to approximately 3.0 mm. In other example embodiments, the pin 108 may have other thicknesses, lengths, or other dimensions. The material of the pin 108 may be formed of various types of metals, composites, carbon fiber, plastics, thermoplastics, polymers, 3-D printing filaments or materials, other materials, and/or combinations thereof, and may be similar to the materials of the coiled diaphragm 102, axle 104, and/or fulcrum disc 106.

The substrate 110 may be formed as a substantially flat sheet, film, or layer of material to which a second end of the pin 108 is coupled. The second end of the pin 108 may couple to the substrate 110 substantially at a center of the substrate 110 or at other positions on the substrate 110, and a plane of the substrate 110 may extend substantially parallel to a plane associated with the substantially flat disc shape of the diaphragm 102, as well as the length or axis of the axle 104 and/or a plane associated with the fulcrum disc 106, as shown in the side view of FIG. 1B. The second end of the pin 108 may couple to an orifice, hole, or connection point of the substrate 110. The substrate 110 may be placed, coupled, adhered, or otherwise positioned on a portion of a surface of an object to detect vibration associated with or proximate the surface. In addition, the substrate 110 may transmit applied or external forces, accelerations, or vibration to the diaphragm 102 via the axle 104, fulcrum disc 106, and pin 108.

The substrate 110 may have a thickness similar to the thicknesses of the coiled diaphragm 102, axle 104, fulcrum disc 106, and pin 108. In addition, the substrate 110 may have a length, width, and/or diameter between approximately 1.0 cm to approximately 2.0 cm. For example, the substrate 110 may have a size or shape that is similar to or larger than a size or shape of the diaphragm 102. In other example embodiments, the substrate 110 may have other thicknesses, lengths, widths, diameters, or other dimensions. The material of the substrate 110 may be formed of various types of metals, composites, carbon fiber, plastics, thermoplastics, polymers, 3-D printing filaments or materials, other materials, and/or combinations thereof, and may be similar to the materials of the coiled diaphragm 102, axle 104, fulcrum disc 106, and/or pin 108.

As described herein, the vibration amplification and detection device comprising a coiled diaphragm 102, an axle 104, a fulcrum disc 106, a pin 108, and a substrate 110 may be positioned on a surface of an object to capture, detect, and measure vibration associated with the surface, e.g., physical vibration of the surface of the object, and/or vibration proximate the surface, e.g., airborne vibration near the surface of the object or within the environment around the object. Based on vibration detected by the vibration detection device, one or more outputs may be instructed or commanded with respect to the object on which the vibration detection device is positioned, and/or with respect to one or more other connected devices or systems.

Although FIGS. 1A and 1B illustrate a particular size, shape, configuration, or arrangement of a vibration detection device, in other example embodiments, the vibration detection device may have various other sizes, shapes, configurations, or arrangements.

For example, the vibration detection device may include a coiled diaphragm having a shape other than substantially circular, such as oval, square, pentagonal, hexagonal, octagonal, or other regular or irregular shape. In example embodiments, a regular and/or symmetrical shape may be preferred in order to balance the coiled diaphragm relative to or around the connection to the first end of the pin.

In addition, the vibration detection device may include a plurality of axles, e.g., two or more axles, that are oriented in different directions from each other. The plurality of axles may function or act similarly to a gimbal mechanism or structure such that the receipt and amplification of vibration by the coiled diaphragm may be less dependent on an orientation of a single axle. For example, two axles may be oriented substantially orthogonal to each other and coupled together to form a gimbal structure substantially at a center of a coiled diaphragm, in order to capture, detect, and measure vibration associated with multiple directions relative to the coiled diaphragm and axles.

In further example embodiments, the vibration detection device may include a coiled diaphragm and a substrate with a pin coupled therebetween, but the vibration detection device may not include an axle or a fulcrum disc. For example, a first end of the pin may be directly coupled to a center of the coiled diaphragm, and a second end of the pin may be directly coupled to the substrate. In this example, a structure of the vibration detection device may be further simplified, and the substrate 110 may transmit applied or external forces, accelerations, or vibration to the diaphragm 102 directly via the pin 108.

In still further example embodiments, one or more components of a vibration detection device may be formed integrally with one or more other components. For example, the axle and fulcrum disc may be formed integrally with each other. In addition, the coiled diaphragm, axle, and fulcrum disc may be formed integrally with each other. Further, the axle, fulcrum disc, and pin may be formed integrally with each other. Moreover, the coiled diaphragm, axle, fulcrum disc, and pin may be formed integrally with each other. Furthermore, the pin and substrate may be formed integrally with each other. Various other combinations of one or more components of a vibration detection device may be formed integrally with each other. In some example embodiments, the one or more components may be formed by 3-D printing processes or methods. Various other types of forming processes or methods may also be used.

In other example embodiments, the diaphragm may comprise a substantially continuous sheet, film, or layer of material, instead of a coiled diaphragm having a tightly wound coil of wire, strip, or filament of material. Similar to the description herein of a tightly wound coil of a coiled diaphragm, the thin material of the substantially continuous sheet, film, or layer forming a diaphragm may generally be rigid, strong, and lightweight enough to maintain the substantially flat shape in the absence of applied or external forces, accelerations, or vibration. However, the thin material of the substantially continuous sheet, film, or layer forming a diaphragm may also generally be flexible, compliant, or resilient enough such that portions of the diaphragm may move or vibrate relative to other portions of the diaphragm responsive to applied or external forces, accelerations, or vibration.

Figure 2A:
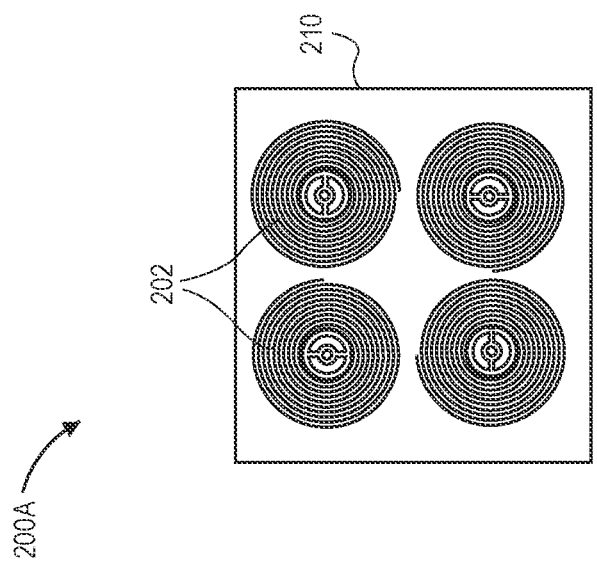
FIG. 2A is a schematic, overhead view diagram of a second example embodiment of a vibration amplification and detection device, in accordance with implementations of the present disclosure.

FIG. 2A is a schematic, overhead view diagram 200A of a second example embodiment of a vibration amplification and detection device, in accordance with implementations of the present disclosure. FIG. 2B is a schematic, side perspective view diagram 200B of a second example embodiment of a vibration amplification and detection device, in accordance with implementations of the present disclosure.

As shown in FIGS. 2A and 2B, a vibration amplification and detection device may comprise a plurality of coiled diaphragms 202 coupled to a substrate 210. Each of the plurality of coiled diaphragms 202 may include any and all of the features of vibration detection devices described with respect to FIGS. 1A and 1B. For example, each of the plurality of coiled diaphragms 202 may include respective axles, fulcrum discs, and/or pins that transmit applied or external forces, accelerations, or vibration associated with or proximate a surface to which the substrate 210 is coupled.

The plurality of coiled diaphragms 202 may be configured or arranged in various positions and orientations. For example, the plurality of coiled diaphragms 202 may be arranged as a 2-D array. In addition, at least some of the plurality of coiled diaphragms 202 may be oriented in different directions from each other. For example, as shown in FIGS. 2A and 2B, a first subset, e.g., two, of the plurality of coiled diaphragms 202 may have respective axles oriented in a first direction, and a second subset, e.g., the other two, of the plurality of coiled diaphragms 202 may have respective axles oriented in a second direction. In example embodiments, the first direction may be substantially orthogonal to the second direction, or the first and second directions may have other orientations relative to each other. By orienting at least some of the plurality of coiled diaphragms 202 in different directions, individual coiled diaphragms 202 may be configured to receive and amplify applied or external forces, accelerations, or vibration that are associated with different directions, e.g., configured to have directional sensitivity. In this manner, portions or components of applied or external forces, accelerations, or vibration associated with different directions may be differentiated, distinguished, or isolated from each other.

The substrate 210 may also include any and all of the features of substrates of vibration detection devices described with respect to FIGS. 1A and 1B. For example, each of the plurality of coiled diaphragms 202 may be coupled to the substrate 210 via respective pins. In addition, the substrate 210 may have a substantially square or rectangular shape, and/or may have a size or shape that is similar to or larger than a size or shape of the 2-D array of the plurality of coiled diaphragms 202. Further, the substrate 210 may be placed, coupled, adhered, or otherwise positioned on a portion of a surface of an object to detect vibration associated with or proximate the surface. In addition, the substrate 210 may transmit applied or external forces, accelerations, or vibration to the plurality of coiled diaphragms 202 via respective axles, fulcrum discs, and/or pins.

Further, in order to capture, detect, or measure movements or vibration of the plurality of coiled diaphragms 202, a sensor 213 may be positioned relative to and configured to capture movements or vibration of the plurality of coiled diaphragms 202. The sensor 213 may capture movements or vibration of a portion of a coiled diaphragm 202 relative to another portion of the same coiled diaphragm 202, as well as capture movements or vibration of a coiled diaphragm 202 associated with the substrate 210 relative to one or more other coiled diaphragms 202 associated with the same substrate 210. The plurality of coiled diaphragms 202 coupled to the substrate 210 and the sensor 213 may together form a vibration detection device 215.

The sensor 213 may comprise various types of sensors to capture, detect, and/or measure movements or vibration of the plurality of coiled diaphragms 202. For example, the sensor 213 may comprise an imaging device, imaging sensor, camera, or other similar optical capture device that captures imaging data of the plurality of coiled diaphragms 202. In addition, the sensor 213 may comprise a line scanner, a laser line scanner, or other similar optical scanner device that captures linear imaging or scanning data of the plurality of coiled diaphragms 202. Further, the sensor 213 may comprise an optical displacement sensor, a laser-based displacement sensor, a capacitive sensor, or other similar distance or displacement sensor that captures movement or vibration data of the plurality of coiled diaphragms 202. Moreover, the sensor 213 may comprise a microphone, audio transducer, or other similar audio sensor that captures movement or vibration data of the plurality of coiled diaphragms 202.

The various types of sensors 213 may detect or capture movements or vibration of the plurality of coiled diaphragms 202 at various sampling or data capture rates. In some example embodiments, the sampling or data capture rate of the sensor 213 may be tuned or selected to capture particular desired frequencies or ranges of frequency associated with the movements or vibration of the plurality of coiled diaphragms. For example, in order to capture relatively lower frequency movements or vibration of the coiled diaphragms, the sampling rate of the sensor 213 may be tuned or selected at a relatively lower sampling rate. Likewise, in order to capture relatively higher frequency movements or vibration of the coiled diaphragms, the sampling rate of the sensor 213 may be tuned or selected at a relatively higher sampling rate. In this manner, the sampling or data capture rate of a sensor may be tuned or selected to capture particular desired frequencies or ranges of frequency without modifying or changing operation of the plurality of coiled diaphragms, e.g., the sensor may be tuned to act as a filter for particular desired frequencies.

Figure 9:
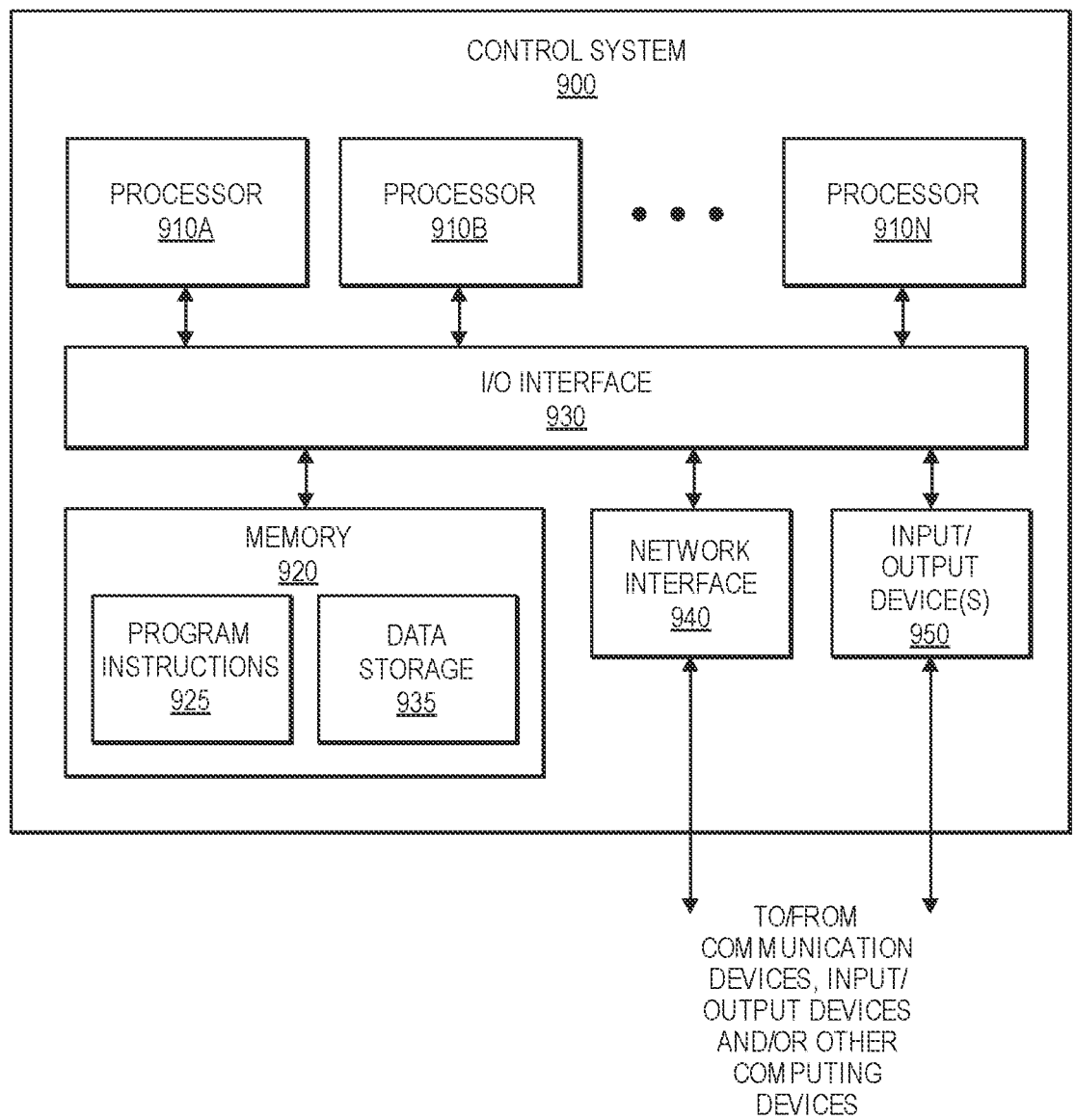
FIG. 9 is a block diagram illustrating an example control system, in accordance with implementations of the present disclosure.

In example embodiments, the sensor 213 may be in communication, via wired or wireless connections, with a controller or control system, as further described herein at least with respect to FIG. 9. For example, the sensor 213 may be instructed by the control system to capture movements or vibration of the plurality of coiled diaphragms 202. In addition, the sensor 213 may transmit data associated with movements or vibration of the plurality of coiled diaphragms 202 to the control system for processing and analysis to determine various properties of the captured movements or vibration.

Figure 2C:
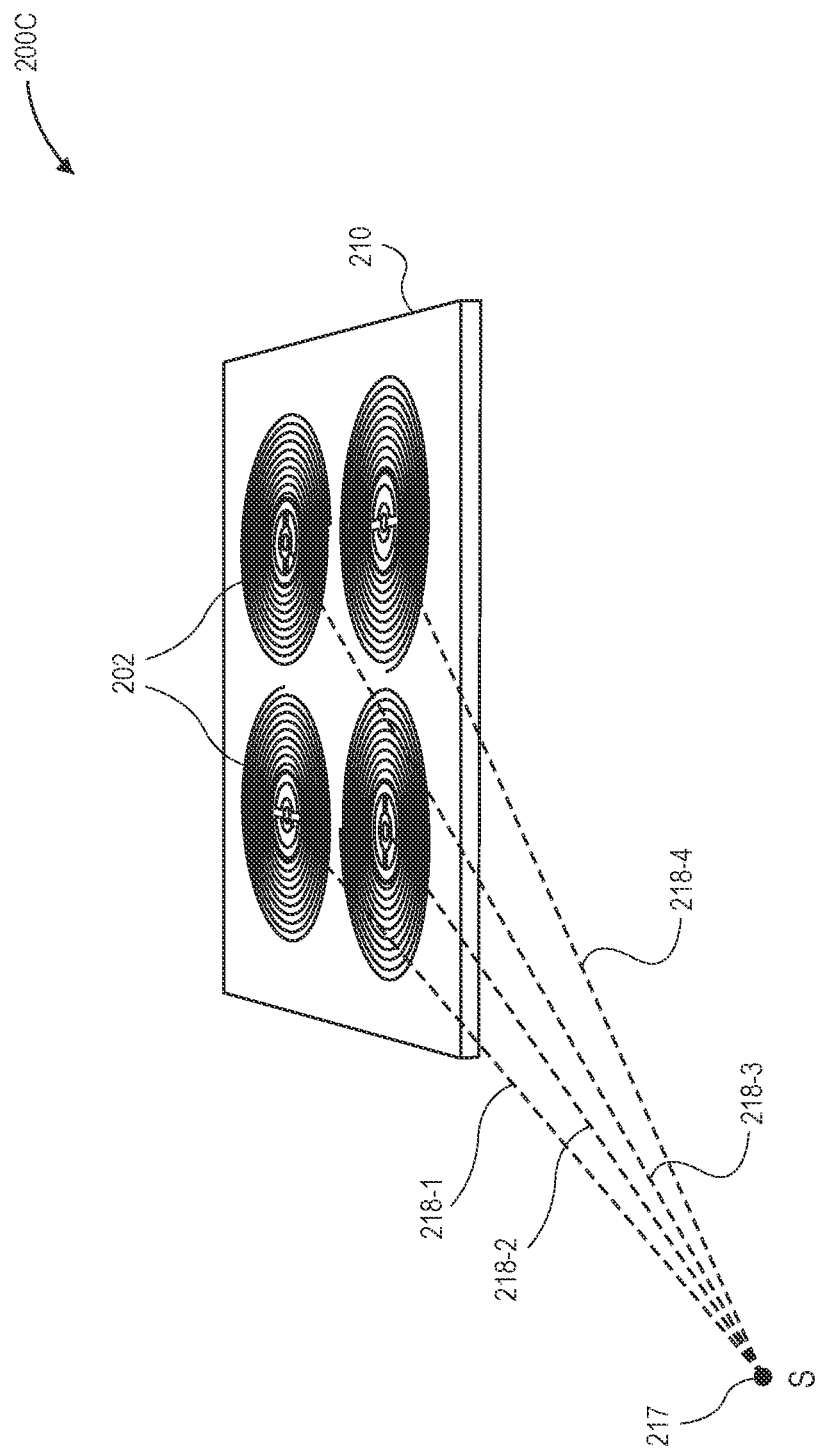
FIG. 2C is a schematic, side perspective view diagram of a second example embodiment of a vibration amplification and detection device and an example vibration source, in accordance with implementations of the present disclosure.

FIG. 2C is a schematic, side perspective view diagram of a second example embodiment of a vibration amplification and detection device and an example vibration source, in accordance with implementations of the present disclosure.

In some example embodiments, the array of coiled diaphragms 202 may facilitate determination or triangulation of an approximate location, position, or orientation of a source of applied or external forces, accelerations, or vibration based at least in part on the different received and amplified vibrations associated with individual ones of the array of coiled diaphragms 202, e.g., at least partially due to the directional sensitivity of individual coiled diaphragms. In addition, the array of coiled diaphragms 202 may facilitate determination or triangulation of an approximate change in location, position, or orientation, a direction of movement, a velocity, and/or an acceleration associated with movement of a source of applied or external forces, accelerations, or vibration based at least in part on the different received and amplified vibrations associated with individual ones of the array of coiled diaphragms 202 over time or over multiple data capture time periods. Such determinations related to aspects or characteristics of a source of applied or external forces, accelerations, or vibration may be utilized to instruct or command one or more functions or operations associated with one or more connected devices, as further described herein.

As shown in FIG. 2C, a vibration amplification and detection device may comprise a plurality of coiled diaphragms 202 coupled to a substrate 210. Each of the plurality of coiled diaphragms 202 may include any and all of the features of vibration detection devices described with respect to FIGS. 1A-2B. For example, each of the plurality of coiled diaphragms 202 may include respective axles, fulcrum discs, and/or pins that transmit applied or external forces, accelerations, or vibration associated with or proximate a surface to which the substrate 210 is coupled. The substrate 210 may also include any and all of the features of substrates of vibration detection devices described with respect to FIGS. 1A-2B.

The plurality of coiled diaphragms 202 may be configured or arranged in various positions and orientations. For example, the plurality of coiled diaphragms 202 may be arranged as a 2-D array. In addition, relative positions and/or orientations of individual ones of the plurality of coiled diaphragms 202 of the 2-D array may be known or defined, e.g., distances, gaps, angles, or positions between individual ones of the coiled diaphragms may be known or defined, and/or relative orientations of respective axles of the coiled diaphragms may also be known or defined.

As illustrated in the example of FIG. 2C, a source 217 of vibration may be positioned at location "S." The location of the vibration source 217 relative to the vibration detection device may be unknown or undefined. Alternatively, the location of the vibration source 217 may be defined or characterized in terms of latitude and longitude coordinates of a global coordinate frame, position coordinates relative to a coordinate frame associated with an object, position coordinates relative to a coordinate frame associated with the vibration detection device, and/or other coordinate frames or systems.

Various forces, accelerations, and/or vibration may originate at or from the vibration source 217, and propagate via a surface of an object and/or via air or other medium toward the coiled diaphragms 202 of the vibration detection device. Example waveforms or vibration signals 218-1, 218-2, 218-3, 218-4 are schematically illustrated in FIG. 2C, which vibration signals propagate from the vibration source 217 toward each of the coiled diaphragms 202. Each of the propagating waveforms or vibration signals 218-1, 218-2, 218-3, 218-4 may have substantially similar properties or characteristics, such as frequency, amplitude, period, phase, and/or other properties because the vibration signals 218 are associated with and emanate from the same vibration source 217.

Responsive to the propagating vibration signals 218 being transmitted toward and reaching the respective coiled diaphragms 202 of the vibration detection device, each of the coiled diaphragms may move or vibrate based on the received vibration signals. Because each of the propagating waveforms or vibration signals 218-1, 218-2, 218-3, 218-4 may have substantially similar properties or characteristics, the movement or vibration of each of the coiled diaphragms 202 may also have substantially similar properties or characteristics. However, for individual coiled diaphragms having different orientations, e.g., different orientations of respective axles, the movement or vibration of coiled diaphragms 202 having such different orientations may have different properties or characteristics from each other, e.g., at least partially due to the directional sensitivity caused by the different orientations.

Furthermore, a location of the vibration source 217 may be determined based on the movement or vibration of each of the coiled diaphragms 202 responsive to the propagating waveforms or vibration signals 218-1, 218-2, 218-3, 218-4. For example, the location of the vibration source 217 may be triangulated based on the propagating vibration signals 218-1, 218-2, 218-3, 218-4 received by each of the coiled diaphragms 202 and based on the known positions and orientations of the coiled diaphragms 202 relative to each other. Generally, the location of the vibration source 217 may be triangulated based on vibration signals received by as few as two coiled diaphragms; however, triangulation of the location of the vibration source 217 may be more accurately performed based on vibration signals received by more than two coiled diaphragms.

In example embodiments, the location of the vibration source 217 relative to the vibration detection device may be determined based on receiving substantially the same vibration signals by respective ones of a plurality of coiled diaphragms at different times, in combination with known or defined positions or orientations of the plurality of coiled diaphragms relative to each other. For example, a first coiled diaphragm that is closer to a vibration source 217 may generally receive a vibration signal from the source 217 earlier in time than a second coiled diaphragm that is farther from the same vibration source 217. Moreover, the directional sensitivity of individual ones of the coiled diaphragms may further assist in the determination of a location of the vibration source 217 relative to the vibration detection device by isolating or accentuating components or portions of the received vibration signals that are aligned with the particular orientations of the coiled diaphragms.

Further, velocity and/or acceleration of a vibration source that is moving relative to a vibration detection device may also be determined based on the movement or vibration of each of the coiled diaphragms 202 responsive to propagating waveforms or vibration signals 218 over multiple time periods, or multiple data capture time periods. For example, based on a determination of a first location of a vibration source at a first time, and a subsequent determination of a second location of the same vibration source at a second time, the velocity and/or acceleration of the vibration source that is moving relative to the vibration detection device may also be determined.

In this manner, a vibration detection device may capture or detection vibration signals, and such vibration signals may be processed to determine one or more properties associated with the waveforms of the vibration signals. In addition, the vibration signals that are captured or detected by a plurality of coiled diaphragms of the vibration detection device may be further processed and analyzed to determine or triangulate an approximate location of a source of the vibration signals relative to the coiled diaphragms, as well as an approximate velocity and/or acceleration of the source of the vibration signals relative to the coiled diaphragms over time.

FIG. 3A is a schematic, overhead view diagram 300A of a third example embodiment of a vibration amplification and detection device, in accordance with implementations of the present disclosure. FIG. 3B is a schematic, side perspective view diagram 300B of a third example embodiment of a vibration amplification and detection device, in accordance with implementations of the present disclosure.

As shown in FIGS. 3A and 3B, a vibration amplification and detection device may comprise a plurality of coiled diaphragms 302 coupled to a substrate 310. Each of the plurality of coiled diaphragms 302 may include any and all of the features of vibration detection devices described with respect to FIGS. 1A-2C. For example, each of the plurality of coiled diaphragms 302 may include respective axles, fulcrum discs, and/or pins that transmit applied or external forces, accelerations, or vibration associated with or proximate a surface to which the substrate 310 is coupled.

The plurality of coiled diaphragms 302 may be configured or arranged in various positions and orientations. For example, the plurality of coiled diaphragms 302 may be arranged as a triangular 2-D array. In addition, at least some of the plurality of coiled diaphragms 302 may be oriented in different directions from each other. For example, as shown in FIGS. 3A and 3B, a first subset, e.g., two, of the plurality of coiled diaphragms 302 may have respective axles oriented in a first direction, a second subset, e.g., another two, of the plurality of coiled diaphragms 302 may have respective axles oriented in a second direction, and a third subset, e.g., remaining two, of the plurality of coiled diaphragms 302 may have respective axles oriented in a third direction. In example embodiments, the first, second, and third directions may have various orientations relative to each other. By orienting at least some of the plurality of coiled diaphragms 302 in different directions, individual coiled diaphragms 302 may be configured to receive and amplify applied or external forces, accelerations, or vibration that are associated with different directions, e.g., configured to have directional sensitivity. In this manner, portions or components of applied or external forces, accelerations, or vibration associated with different directions may be differentiated, distinguished, or isolated from each other.

The substrate 310 may also include any and all of the features of substrates of vibration detection devices described with respect to FIGS. 1A-2C. For example, each of the plurality of coiled diaphragms 302 may be coupled to the substrate 310 via respective pins. In addition, the substrate 310 may have a substantially triangular shape, and/or may have a size or shape that is similar to or larger than a size or shape of the 2-D array of the plurality of coiled diaphragms 302. Further, the substrate 310 may be placed, coupled, adhered, or otherwise positioned on a portion of a surface of an object to detect vibration associated with or proximate the surface. In addition, the substrate 310 may transmit applied or external forces, accelerations, or vibration to the plurality of coiled diaphragms 302 via respective axles, fulcrum discs, and/or pins.

Further, in order to capture, detect, or measure movements or vibration of the plurality of coiled diaphragms 302, a sensor 313 may be positioned relative to and configured to capture movements or vibration of the plurality of coiled diaphragms 302. The sensor 313 may capture movements or vibration of a portion of a coiled diaphragm 302 relative to another portion of the same coiled diaphragm 302, as well as capture movements or vibration of a coiled diaphragm 302 associated with the substrate 310 relative to one or more other coiled diaphragms 302 associated with the same substrate 310. The plurality of coiled diaphragms 302 coupled to the substrate 310 and the sensor 313 may together form a vibration detection device 315.

The sensor 313 may comprise various types of sensors to capture, detect, and/or measure movements or vibration of the plurality of coiled diaphragms 302. For example, the sensor 313 may comprise an imaging device, imaging sensor, camera, or other similar optical capture device that captures imaging data of the plurality of coiled diaphragms 302. In addition, the sensor 313 may comprise a line scanner, a laser line scanner, or other similar optical scanner device that captures linear imaging or scanning data of the plurality of coiled diaphragms 302. Further, the sensor 313 may comprise an optical displacement sensor, a laser-based displacement sensor, a capacitive sensor, or other similar distance or displacement sensor that captures movement or vibration data of the plurality of coiled diaphragms 302. Moreover, the sensor 313 may comprise a microphone, audio transducer, or other similar audio sensor that captures movement or vibration data of the plurality of coiled diaphragms 302.

The various types of sensors 313 may detect or capture movements or vibration of the plurality of coiled diaphragms 302 at various sampling or data capture rates. In some example embodiments, the sampling or data capture rate of the sensor 313 may be tuned or selected to capture particular desired frequencies or ranges of frequency associated with the movements or vibration of the plurality of coiled diaphragms. For example, in order to capture relatively lower frequency movements or vibration of the coiled diaphragms, the sampling rate of the sensor 313 may be tuned or selected at a relatively lower sampling rate. Likewise, in order to capture relatively higher frequency movements or vibration of the coiled diaphragms, the sampling rate of the sensor 313 may be tuned or selected at a relatively higher sampling rate. In this manner, the sampling or data capture rate of a sensor may be tuned or selected to capture particular desired frequencies or ranges of frequency without modifying or changing operation of the plurality of coiled diaphragms, e.g., the sensor may be tuned to act as a filter for particular desired frequencies.

In example embodiments, the sensor 313 may be in communication, via wired or wireless connections, with a controller or control system, as further described herein at least with respect to FIG. 9. For example, the sensor 313 may be instructed by the control system to capture movements or vibration of the plurality of coiled diaphragms 302. In addition, the sensor 313 may transmit data associated with movements or vibration of the plurality of coiled diaphragms 302 to the control system for processing and analysis to determine various properties of the captured movements or vibration.

In some example embodiments, the array of coiled diaphragms 302 may facilitate determination or triangulation of an approximate location, position, or orientation of a source of applied or external forces, accelerations, or vibration based at least in part on the different received and amplified vibrations associated with individual ones of the array of coiled diaphragms 302, e.g., due to the directional sensitivity of individual coiled diaphragms. In addition, the array of coiled diaphragms 302 may facilitate determination or triangulation of an approximate change in location, position, or orientation, a direction of movement, a velocity, and/or an acceleration associated with movement of a source of applied or external forces, accelerations, or vibration based at least in part on the different received and amplified vibrations associated with individual ones of the array of coiled diaphragms 302 over time or over multiple data capture time periods. Such determinations related to aspects or characteristics of a source of applied or external forces, accelerations, or vibration may be utilized to instruct or command one or more functions or operations associated with one or more connected devices, as further described herein.

Figure 4A:
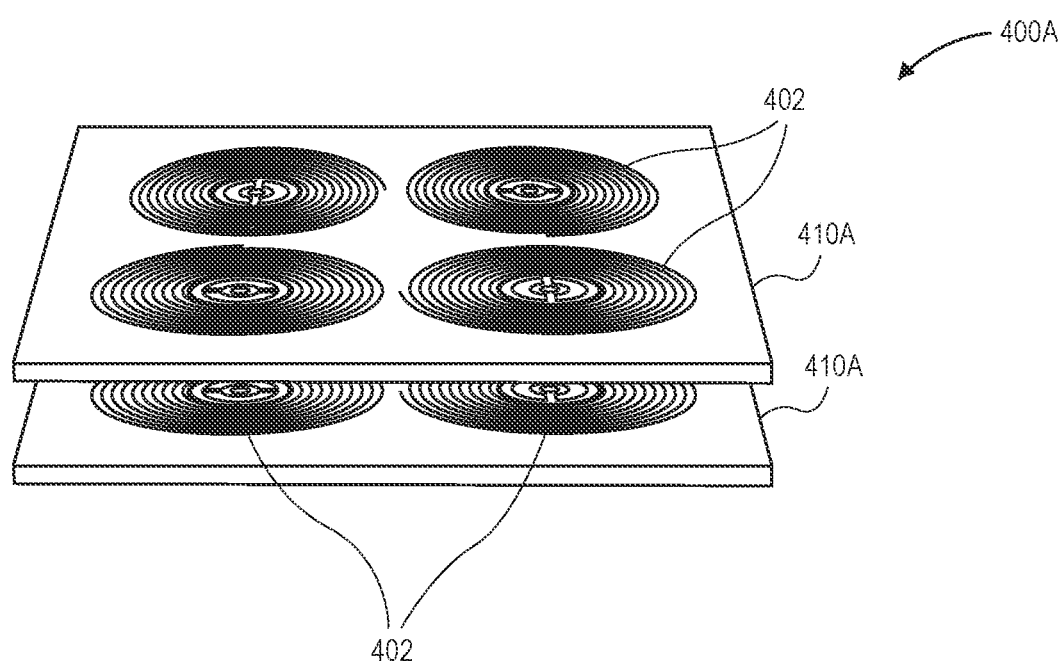
FIG. 4A is a schematic, perspective view diagram of a fourth example embodiment of a vibration amplification and detection device, in accordance with implementations of the present disclosure.

FIG. 4A is a schematic, perspective view diagram 400A of a fourth example embodiment of a vibration amplification and detection device, in accordance with implementations of the present disclosure.

As shown in FIG. 4A, a vibration amplification and detection device may comprise a plurality of coiled diaphragms 402 coupled to a plurality of substrates 410A that may form two or more layers of a three-dimensional vibration detection device. Each of the plurality of coiled diaphragms 402 may include any and all of the features of vibration detection devices described with respect to FIGS. 1A-3B. For example, each of the plurality of coiled diaphragms 402 may include respective axles, fulcrum discs, and/or pins that transmit applied or external forces, accelerations, or vibration associated with or proximate a surface to which the plurality of substrates 410A is coupled.

The plurality of coiled diaphragms 402 may be configured or arranged in various positions and orientations. For example, the plurality of coiled diaphragms 402 may be arranged as a plurality of 2-D arrays or layers that may together form a 3-D array or stack of layers. In addition, at least some of the plurality of coiled diaphragms 402 may be oriented in different directions from each other. For example, as shown in FIG. 4A, for each 2-D array or layer of coiled diaphragms 402, a first subset, e.g., two, of the plurality of coiled diaphragms 402 may have respective axles oriented in a first direction, and a second subset, e.g., the other two, of the plurality of coiled diaphragms 402 may have respective axles oriented in a second direction. In example embodiments, the first direction may be substantially orthogonal to the second direction, or the first and second directions may have other orientations relative to each other. In addition, respective first and second directions associated with individual 2-D arrays or layers of coiled diaphragms 402 may have different orientations relative to respective first and second directions associated with other 2-D arrays or layers of coiled diaphragms 402. By orienting at least some of the plurality of coiled diaphragms 402 in different directions, individual coiled diaphragms 402 may be configured to receive and amplify applied or external forces, accelerations, or vibration that are associated with different directions, e.g., configured to have directional sensitivity. In this manner, portions or components of applied or external forces, accelerations, or vibration associated with different directions may be differentiated, distinguished, or isolated from each other.

The plurality of substrates 410A may also include any and all of the features of substrates of vibration detection devices described with respect to FIGS. 1A-3B. For example, each of the plurality of coiled diaphragms 402 may be coupled to a respective substrate 410A via respective pins. In addition, the plurality of substrates 410A may be arranged as layers that are substantially parallel to each other and forming a three-dimensional stack of layers. The individual layers may be spaced apart from each other by a separation distance, e.g., approximately 1.0 cm or other distances, and individual layers of the plurality of substrates 410A may have a size or shape that is similar to or larger than a size or shape of the 2-D array of the plurality of coiled diaphragms 402 associated with the individual layers. Further, a portion of the plurality of substrates 410A may be placed, coupled, adhered, or otherwise positioned on a portion of a surface of an object to detect vibration associated with or proximate the surface. In addition, the plurality of substrates 410A may transmit applied or external forces, accelerations, or vibration to the plurality of coiled diaphragms 402 via respective axles, fulcrum discs, and/or pins.

As described herein, in order to capture, detect, or measure movements or vibration of the plurality of coiled diaphragms 402, one or more sensors may be positioned relative to and configured to capture movements or vibration of the plurality of coiled diaphragms 402. The one or more sensors may capture movements or vibration of a portion of a coiled diaphragm 402 relative to another portion of the same coiled diaphragm 402, as well as capture movements or vibration of a coiled diaphragm 402 associated with a layer of the plurality of substrates 410A relative to one or more other coiled diaphragms 402 associated with the same layer of the plurality of substrates 410A. The plurality of coiled diaphragms 402 coupled to the plurality of substrates 410A and the one or more sensors may together form a vibration detection device.

Furthermore, as stated herein, the one or more sensors may comprise various types of sensors to capture, detect, and/or measure movements or vibration of the plurality of coiled diaphragms 402. For example, the one or more sensors may comprise imaging devices, imaging sensors, cameras, or other similar optical capture devices that capture imaging data of the plurality of coiled diaphragms 402. In addition, the one or more sensors may comprise line scanners, laser line scanners, or other similar optical scanner devices that capture linear imaging or scanning data of the plurality of coiled diaphragms 402. Further, the one or more sensors may comprise optical displacement sensors, laser-based displacement sensors, capacitive sensors, or other similar distance or displacement sensors that capture movement or vibration data of the plurality of coiled diaphragms 402. Moreover, the one or more sensors may comprise microphones, audio transducers, or other similar audio sensors that capture movement or vibration data of the plurality of coiled diaphragms 402.

The various types of sensors may detect or capture movements or vibration of the plurality of coiled diaphragms 402 at various sampling or data capture rates. In some example embodiments, the sampling or data capture rates of the sensors may be tuned or selected to capture particular desired frequencies or ranges of frequency associated with the movements or vibration of the plurality of coiled diaphragms. For example, in order to capture relatively lower frequency movements or vibration of the coiled diaphragms, the sampling rates of the sensors may be tuned or selected at relatively lower sampling rates. Likewise, in order to capture relatively higher frequency movements or vibration of the coiled diaphragms, the sampling rates of the sensors may be tuned or selected at relatively higher sampling rates. In this manner, the sampling or data capture rates of sensors may be tuned or selected to capture particular desired frequencies or ranges of frequency without modifying or changing operation of the plurality of coiled diaphragms, e.g., the sensors may be tuned to act as filters for particular desired frequencies.

In example embodiments, the one or more sensors may be in communication, via wired or wireless connections, with a controller or control system, as further described herein at least with respect to FIG. 9. For example, the one or more sensors may be instructed by the control system to capture movements or vibration of the plurality of coiled diaphragms 402. In addition, the one or more sensors may transmit data associated with movements or vibration of the plurality of coiled diaphragms 402 to the control system for processing and analysis to determine various properties of the captured movements or vibration.

In some example embodiments, the plurality of arrays of coiled diaphragms 402 may facilitate determination or triangulation of an approximate location, position, or orientation of a source of applied or external forces, accelerations, or vibration based at least in part on the different received and amplified vibrations associated with individual ones of the plurality of arrays of coiled diaphragms 402, e.g., due to the directional sensitivity of individual coiled diaphragms. In addition, the plurality of arrays of coiled diaphragms 402 may facilitate determination or triangulation of an approximate change in location, position, or orientation, a direction of movement, a velocity, and/or an acceleration associated with movement of a source of applied or external forces, accelerations, or vibration based at least in part on the different received and amplified vibrations associated with individual ones of the plurality of arrays of coiled diaphragms 402 over time or over multiple data capture time periods. Such determinations related to aspects or characteristics of a source of applied or external forces, accelerations, or vibration may be utilized to instruct or command one or more functions or operations associated with one or more connected devices, as further described herein.

Figure 4B:
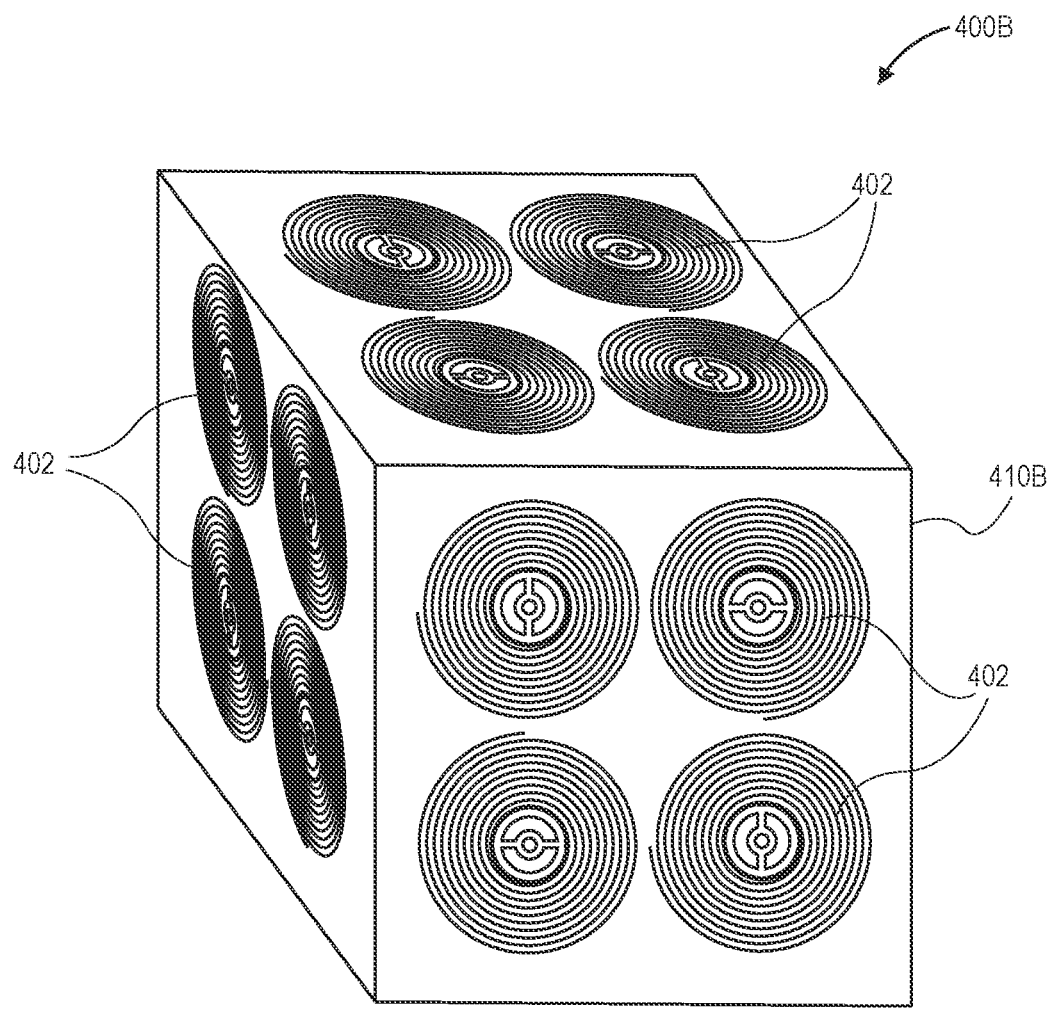
FIG. 4B is a schematic, perspective view diagram of a fifth example embodiment of a vibration amplification and detection device, in accordance with implementations of the present disclosure.

FIG. 4B is a schematic, perspective view diagram 400B of a fifth example embodiment of a vibration amplification and detection device, in accordance with implementations of the present disclosure.

As shown in FIG. 4B, a vibration amplification and detection device may comprise a plurality of coiled diaphragms 402 coupled to a substrate 410B. Each of the plurality of coiled diaphragms 402 may include any and all of the features of vibration detection devices described with respect to FIGS. 1A-3B. For example, each of the plurality of coiled diaphragms 402 may include respective axles, fulcrum discs, and/or pins that transmit applied or external forces, accelerations, or vibration associated with or proximate a surface to which the substrate 410B is coupled.

The plurality of coiled diaphragms 402 may be configured or arranged in various positions and orientations. For example, the plurality of coiled diaphragms 402 may be arranged as a plurality of 2-D arrays that may together form a 3-D array, e.g., a cube or other 3-D shape. In addition, at least some of the plurality of coiled diaphragms 402 may be oriented in different directions from each other. For example, as shown in FIG. 4B, for each 2-D array of coiled diaphragms 402, a first subset, e.g., two, of the plurality of coiled diaphragms 402 may have respective axles oriented in a first direction, and a second subset, e.g., the other two, of the plurality of coiled diaphragms 402 may have respective axles oriented in a second direction. In example embodiments, the first direction may be substantially orthogonal to the second direction, or the first and second directions may have other orientations relative to each other. In addition, respective first and second directions associated with a first 2-D array of coiled diaphragms 402 may be substantially orthogonal to respective first and second directions associated with a second 2-D array of coiled diaphragms 402, or the respective directions associated with individual 2-D arrays of coiled diaphragms 402 may have other orientations relative to each other. By orienting at least some of the plurality of coiled diaphragms 402 in different directions, individual coiled diaphragms 402 may be configured to receive and amplify applied or external forces, accelerations, or vibration that are associated with different directions, e.g., configured to have directional sensitivity. In this manner, portions or components of applied or external forces, accelerations, or vibration associated with different directions may be differentiated, distinguished, or isolated from each other.

The substrate 410B may also include any and all of the features of substrates of vibration detection devices described with respect to FIGS. 1A-3B. For example, each of the plurality of coiled diaphragms 402 may be coupled to the substrate 410B via respective pins. In addition, the substrate 410B may have a three-dimensional shape, e.g., a substantially cubic shape, and individual faces or surfaces of the substrate 410B may have a size or shape that is similar to or larger than a size or shape of the 2-D array of the plurality of coiled diaphragms 402 associated with the individual faces or surfaces. Further, a portion of the substrate 410B may be placed, coupled, adhered, or otherwise positioned on a portion of a surface of an object to detect vibration associated with or proximate the surface. In addition, the substrate 410B may transmit applied or external forces, accelerations, or vibration to the plurality of coiled diaphragms 402 via respective axles, fulcrum discs, and/or pins.

As described herein, in order to capture, detect, or measure movements or vibration of the plurality of coiled diaphragms 402, one or more sensors may be positioned relative to and configured to capture movements or vibration of the plurality of coiled diaphragms 402. The one or more sensors may capture movements or vibration of a portion of a coiled diaphragm 402 relative to another portion of the same coiled diaphragm 402, as well as capture movements or vibration of a coiled diaphragm 402 associated with a face of the substrate 410B relative to one or more other coiled diaphragms 402 associated with the same face of the substrate 410B. The plurality of coiled diaphragms 402 coupled to the substrate 410B and the one or more sensors may together form a vibration detection device.

Furthermore, as stated herein, the one or more sensors may comprise various types of sensors to capture, detect, and/or measure movements or vibration of the plurality of coiled diaphragms 402. For example, the one or more sensors may comprise imaging devices, imaging sensors, cameras, or other similar optical capture devices that capture imaging data of the plurality of coiled diaphragms 402. In addition, the one or more sensors may comprise line scanners, laser line scanners, or other similar optical scanner devices that capture linear imaging or scanning data of the plurality of coiled diaphragms 402. Further, the one or more sensors may comprise optical displacement sensors, laser-based displacement sensors, capacitive sensors, or other similar distance or displacement sensors that capture movement or vibration data of the plurality of coiled diaphragms 402. Moreover, the one or more sensors may comprise microphones, audio transducers, or other similar audio sensors that capture movement or vibration data of the plurality of coiled diaphragms 402.

The various types of sensors may detect or capture movements or vibration of the plurality of coiled diaphragms 402 at various sampling or data capture rates. In some example embodiments, the sampling or data capture rates of the sensors may be tuned or selected to capture particular desired frequencies or ranges of frequency associated with the movements or vibration of the plurality of coiled diaphragms. For example, in order to capture relatively lower frequency movements or vibration of the coiled diaphragms, the sampling rates of the sensors may be tuned or selected at relatively lower sampling rates. Likewise, in order to capture relatively higher frequency movements or vibration of the coiled diaphragms, the sampling rates of the sensors may be tuned or selected at relatively higher sampling rates. In this manner, the sampling or data capture rates of sensors may be tuned or selected to capture particular desired frequencies or ranges of frequency without modifying or changing operation of the plurality of coiled diaphragms, e.g., the sensors may be tuned to act as filters for particular desired frequencies.

In example embodiments, the one or more sensors may be in communication, via wired or wireless connections, with a controller or control system, as further described herein at least with respect to FIG. 9. For example, the one or more sensors may be instructed by the control system to capture movements or vibration of the plurality of coiled diaphragms 402. In addition, the one or more sensors may transmit data associated with movements or vibration of the plurality of coiled diaphragms 402 to the control system for processing and analysis to determine various properties of the captured movements or vibration.

In some example embodiments, the plurality of arrays of coiled diaphragms 402 may facilitate determination or triangulation of an approximate location, position, or orientation of a source of applied or external forces, accelerations, or vibration based at least in part on the different received and amplified vibrations associated with individual ones of the plurality of arrays of coiled diaphragms 402, e.g., due to the directional sensitivity of individual coiled diaphragms. In addition, the plurality of arrays of coiled diaphragms 402 may facilitate determination or triangulation of an approximate change in location, position, or orientation, a direction of movement, a velocity, and/or an acceleration associated with movement of a source of applied or external forces, accelerations, or vibration based at least in part on the different received and amplified vibrations associated with individual ones of the plurality of arrays of coiled diaphragms 402 over time or over multiple data capture time periods. Such determinations related to aspects or characteristics of a source of applied or external forces, accelerations, or vibration may be utilized to instruct or command one or more functions or operations associated with one or more connected devices, as further described herein.

Figure 5:
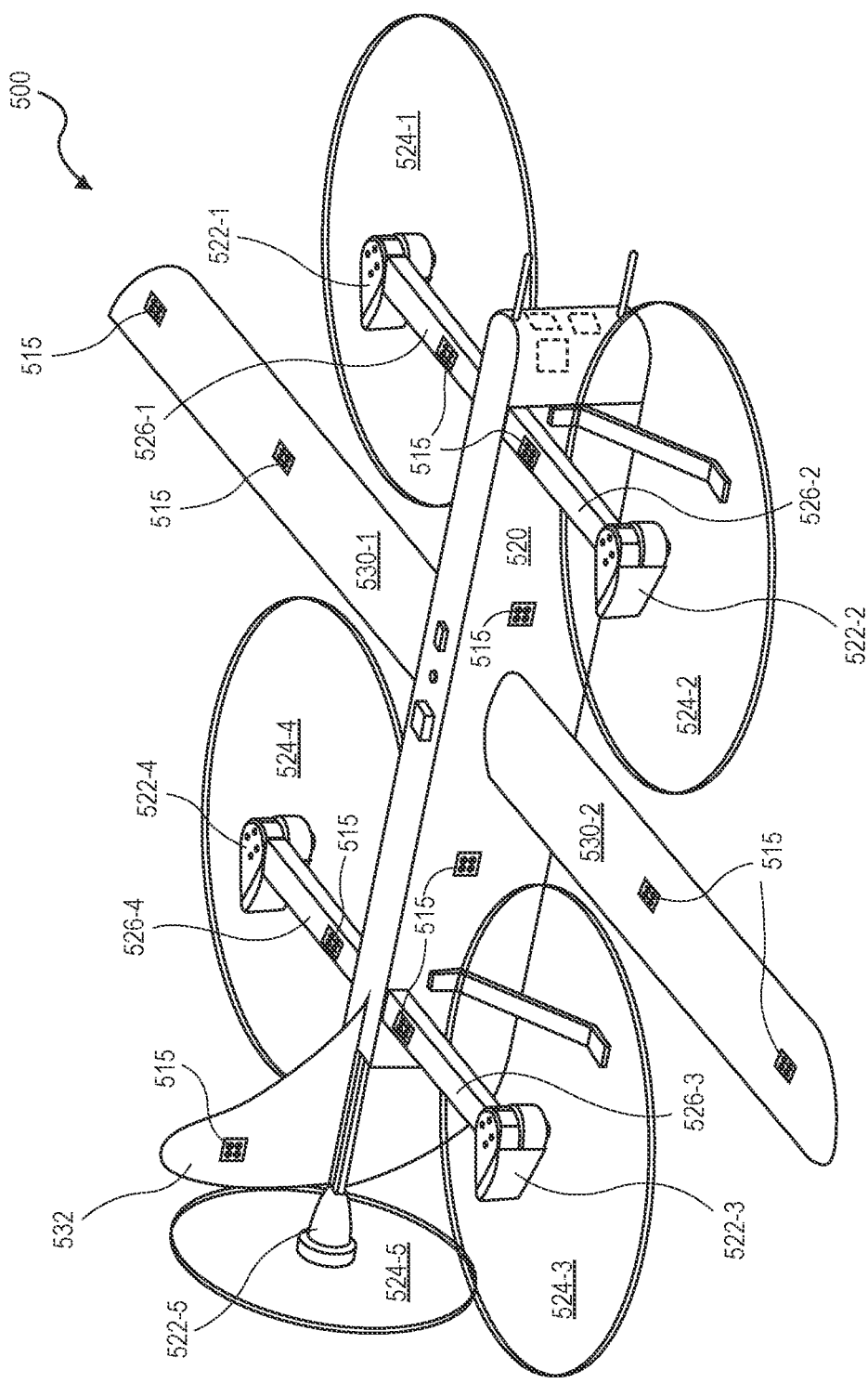
FIG. 5 is a schematic, perspective view diagram of an example aerial vehicle having a plurality of vibration amplification and detection devices, in accordance with implementations of the present disclosure.

FIG. 5 is a schematic, perspective view diagram 500 of an example aerial vehicle having a plurality of vibration amplification and detection devices, in accordance with implementations of the present disclosure.

As shown in FIG. 5, an aerial vehicle may include a frame, fuselage, or body 520. The body 520 of the aerial vehicle may be formed of any suitable material, such as graphite, carbon fiber, aluminum, fiberglass, etc., or any combination thereof. In one example, the body 520 of the aerial vehicle may be formed of machined aluminum in a rectangular prism shape. In addition, one or more portions, sections, or panels of the body 520 may be machined into a grid or hash pattern to reduce the weight of the body, provide support, and provide locations for mounting other components of the aerial vehicle.

The body 520 may encompass or house one or more power supplies, a payload, and/or other components such as an aerial vehicle control system. The body 520 may be formed as a rectangular prism shape using one or more attachment mechanisms, such as screws, rivets, latches, quarter-turn fasteners, etc. In some implementations, the attachment mechanisms may be configured to enable easy removal and reattachment of one or more portions, sections, or panels of the body 520, e.g., to facilitate power supply replacement, and/or maintenance to other components such as the aerial vehicle control system.

The payload, such as a package or item to be delivered to a user, may be configured to fit within the body 520, and/or be removably coupled to a portion of the body 520 of the aerial vehicle. In other implementations, the payload may form a portion of the body 520. For example, the body 520 may include a gap or opening, and when the payload is coupled to the body 520 of the aerial vehicle, the sides or surfaces of the payload may complete the body 520.

Mounted to the body 520 may be four motor arms 526-1, 526-2, 526-3, 526-4. In this example, the motor arms 526-1, 526-2, 526-3, 526-4 may be approximately the same length, and may be arranged substantially parallel to one another and perpendicular to the body 520. In other implementations, the motor arms 526 may be of different lengths (e.g., the front motor arms 526-1, 526-2 may be shorter than the rear motor arms 526-3, 526-4) and/or arranged at different locations and/or orientations on the aerial vehicle.

Mounted to distal ends of the motor arms 526 may be lifting motors 522-1, 522-2, 522-3, 522-4 and associated lifting motor housings. In one implementation, the lifting motors 522 may be mounted so that propeller shafts of the lifting motors 522 that mount to the propellers 524-1, 524-2, 524-3, 524-4 are facing downward with respect to the aerial vehicle. In other implementations, the lifting motors 522 may be mounted with the propeller shafts facing upwards with respect to the aerial vehicle. In still other implementations, one or more of the lifting motors 522 may be mounted with the propeller shafts facing downward and one or more of the lifting motors 522 may be mounted with the propeller shafts facing upward. In other implementations, the lifting motors 522 may be mounted at other angles with respect to the body 520 of the aerial vehicle. The lifting motors 522 may be any form of motor capable of generating enough rotational speed with the propellers 524 to lift the aerial vehicle and any engaged payload, thereby enabling aerial transport of the payload. For example, the lifting motors 522 may each be a FX-4006-13 740kv multi-rotor motor, or a Tiger U-11 motor.

The lifting motor housings around respective lifting motors 522 may be formed of any material, such as carbon fiber, aluminum, graphite, etc. In one example, the lifting motor housings may be aerodynamically shaped to reduce friction of air flow during horizontal flight of the aerial vehicle. For example, the lifting motor housings may be tapered toward the rear of the aerial vehicle. Likewise, the lifting motor housings may be cone-shaped with the narrow end of the cone directed toward the nose of the aerial vehicle. In some implementations, the motor arms 526 may also have an aerodynamic form or shape. For example, the motor arms 526 may be tapered toward the rear (e.g., "teardrop" shaped) of the aerial vehicle and/or may have an airfoil design to provide additional lift to the aerial vehicle when the aerial vehicle moves horizontally.

Mounted to each lifting motor 522-1, 522-2, 522-3, 522-4 may be a respective lifting propeller 524-1, 524-2, 524-3, 524-4. The lifting propellers 524 may be any form of propeller (e.g., graphite, carbon fiber) and of a size sufficient to lift the aerial vehicle and any payload engaged by the aerial vehicle so that the aerial vehicle can navigate through the air, for example, to deliver a payload to a delivery location. For example, the lifting propellers 524 may each be carbon fiber propellers having a dimension or diameter of approximately twenty-nine inches. Although FIG. 5 shows the lifting propellers 524 all of a same size, in some implementations, one or more of the lifting propellers 524 may be different sizes and/or dimensions. Likewise, while this example includes four lifting propellers 524, in other implementations, more or fewer propellers 524 may be utilized as lifting propellers 524. Likewise, in some implementations, the propellers 524 may be positioned at different locations on the aerial vehicle. In addition, alternative methods of propulsion may be utilized as "motors" in implementations described herein. For example, fans, jets, turbojets, turbo fans, jet engines, internal combustion engines, and the like may be used (either with propellers or other devices) to provide thrust for the aerial vehicle.

Mounted to a rear end of the body 520 of the aerial vehicle may be a pushing motor 522-5 and associated pushing motor housing, and a pushing propeller 524-5. While the term "pushing motor" is used, those having ordinary skill will appreciate that the position of motor 522-5 and propeller 524-5 may be modified, reconfigured, or changed, e.g., to a forward end of the body 520, such that pushing motor 522-5 actually "pulls" the aerial vehicle in a horizontal direction rather than pushes it. As such, as used herein, the term "pushing motor" shall be construed to include implementations configured for either "push" horizontal thrust or "pull" horizontal thrust. The pushing motor housing may be aerodynamically shaped and configured to encase the pushing motor 522-5. The pushing motor 522-5 and the pushing propeller 524-5 may be the same as or different than the lifting motors 522-1, 522-2, 522-3, 522-4 and lifting propellers 524-1, 524-2, 524-3, 524-4. For example, in some implementations, the pushing motor 522-5 may be a Tiger U-8 motor and the pushing propeller 524-5 may have a dimension or diameter of approximately eighteen inches. In some implementations, the pushing propeller 524-5 may have a smaller dimension or diameter than the lifting propellers.

The pushing motor 522-5 and pushing propeller 524-5 may be oriented at approximately ninety degrees with respect to the body 520 of the aerial vehicle and utilized to increase the efficiency of flight that includes a horizontal component. For example, when the aerial vehicle is traveling in a direction that includes a horizontal component, the pushing motor 522-5 may be engaged to provide horizontal thrust force via the pushing propeller 524-5 to propel the aerial vehicle horizontally. As a result, the speed and power utilized by the lifting motors 522-1, 522-2, 522-3, 522-4 may be reduced. Alternatively, in selected implementations, the pushing motor 522-5 may be oriented at an angle greater or less than ninety degrees with respect to body 520 to provide a combination of pushing and lifting thrust.

Mounted to a rear end of the body 520 of the aerial vehicle may also be a vertical stabilizer 532 extending upward from the top of the body 520. The vertical stabilizer 532 may enable greater control of the aerial vehicle during horizontal flight, e.g., forward flight. In some implementations, the vertical stabilizer 532 may also include one or more rudders or other control surfaces, e.g., to adjust yaw of the aerial vehicle during horizontal flight. Likewise, in some implementations, the aerial vehicle may also include horizontal stabilizers (not shown) which may include elevators or other control surfaces, e.g., to adjust pitch and/or roll of the aerial vehicle during horizontal flight.

Mounted to a portion of the body 520 of the aerial vehicle may be one or more wing sections 530-1, 530-2. The wing sections 530 may generate lift during horizontal flight, e.g., forward flight, of the aerial vehicle. The wing sections 530 may be formed of any suitable material such as, but not limited to, carbon fiber, aluminum, fabric, plastic, fiberglass, etc. In one example, the wing sections 530-1, 530-2 may extend from an approximate midpoint of the body 520 and outward toward opposite sides of the aerial vehicle. For example, the wing sections 530 may be coupled to the body 520 and positioned between the front motor arms 526-1, 526-2 and associated lifting motors 522-1, 522-2 and the rear motor arms 526-3, 526-4 and associated lifting motors 522-3, 522-4. In other examples, more than two wing sections 530 may be included on the aerial vehicle, and the wing sections 530 may have different shapes, sizes, and/or dimensions. Further, the wing sections 530 may be coupled to different portions of the body 520 of the aerial vehicle. For example, the wing sections 530 may be positioned above the lifting motors 522 and/or lifting propellers 524. Moreover, the wing sections 530 may be integrally formed with the motor arms 526.

The wing sections 530 may be designed to have an airfoil shape to provide lift to the aerial vehicle as the aerial vehicle moves horizontally. In some implementations, utilizing the pushing motor 522-5 and pushing propeller 524-5 in conjunction with the wing sections 530, when the aerial vehicle is moving in a direction that includes a horizontal component, the rotational speed of the lifting motors 522-1, 522-2, 522-3, 522-4 and lifting propellers 524-1, 524-2, 524-3, 524-4 may be reduced or eliminated as the wing sections 530 may provide lift and keep the aerial vehicle airborne when thrust is applied in a horizontal direction by the pushing motor 522-5 and pushing propeller 524-5. In implementations where the wing sections 530 include flaps, ailerons, and/or other control surfaces, the pitch, yaw, and/or roll of the aerial vehicle may be controlled using the flaps, ailerons, and/or other control surfaces alone or in combination with the lifting motors 522-1, 522-2, 522-3, 522-4 and lifting propellers 524-1, 524-2, 524-3, 524-4, as well as the vertical stabilizer 532 and any associated rudders or other control surfaces. If the wing sections 530 do not include flaps, ailerons, and/or other control surfaces, the lifting motors 522-1, 522-2, 522-3, 522-4 and lifting propellers 524-1, 524-2, 524-3, 524-4, as well as the vertical stabilizer 532 and any associated rudders or other control surfaces, may be utilized to control the pitch, yaw, and/or roll of the aerial vehicle during flight. In some implementations, the wing sections 530 may be configured to rotate or pivot about the body 520 of the aerial vehicle to reduce drag when the aerial vehicle is moving a direction that includes a vertical component.

As shown in FIG. 5, a plurality of vibration detection devices 515 may be coupled, attached, or positioned on various components or portions of the aerial vehicle. Vibration detection devices 515 may be similar to vibration detection devices 215, 315 described herein at least with respect to FIGS. 2A-3B. In addition, the vibration detection devices 515 may include any and all of the features of vibration amplification and detection devices described herein at least with respect to FIGS. 1A-4B. For example, one or more vibration detection devices 515 may be coupled to portions of the body 520, the motor arms 526, the wing sections 530, and/or the vertical stabilizer 532. In other example embodiments, one or more vibration detection devices 515 may be coupled, attached, or positioned on various other components or portions, either internal or external, of the aerial vehicle.

As described herein, each of the plurality of vibration detection devices 515 may be in communication, via wired or wireless connections, with a controller or control system. For example, responsive to instructions or commands received from a control system, one or more of the vibration detection devices 515 may be activated, e.g., one or more sensors associated with the vibration detection devices 515 may be activated to capture, detect, or measure movements or vibration of respective coiled diaphragms.

The vibration detection devices 515 may detect various applied or external forces, accelerations, or vibration associated with or proximate the surfaces on which the respective vibration detection devices 515 are positioned. For example, the coiled diaphragms of respective vibration detection devices 515 may move or vibrate responsive to forces, accelerations, or vibration, e.g., structural changes, movements, or vibration, vibration due to operation of internal components such as motors, actuators, etc., and/or vibration due to other internal factors, associated with respective surfaces on which the vibration detection devices 515 are positioned. As shown in FIG. 5, one or more coiled diaphragms of a vibration detection device 515 positioned on a surface of the body 520 may move or vibrate responsive to forces, accelerations, or vibration associated with the surface of the body 520 on which the vibration detection device 515 is positioned. Likewise, one or more coiled diaphragms of a vibration detection device 515 positioned on a surface of a motor arm 526 may move or vibrate responsive to forces, accelerations, or vibration associated with the surface of the motor arm 526 on which the vibration detection device 515 is positioned. Further, one or more coiled diaphragms of a vibration detection device 515 positioned on a surface of a wing section 530 may move or vibrate responsive to forces, accelerations, or vibration associated with the surface of the wing section 530 on which the vibration detection device 515 is positioned.

Moreover, the coiled diaphragms of respective vibration detection devices 515 may move or vibrate responsive to external forces, accelerations, or vibration, e.g., wind, aerodynamic forces, external objects, and/or other external factors, proximate respective surfaces on which the vibration detection devices 515 are positioned. As shown in FIG. 5, one or more coiled diaphragms of a vibration detection device 515 positioned on a surface of the body 520 may move or vibrate responsive to external forces, accelerations, or vibration proximate the surface of the body 520 on which the vibration detection device 515 is positioned. Likewise, one or more coiled diaphragms of a vibration detection device 515 positioned on a surface of a motor arm 526 may move or vibrate responsive to external forces, accelerations, or vibration proximate the surface of the motor arm 526 on which the vibration detection device 515 is positioned. Further, one or more coiled diaphragms of a vibration detection device 515 positioned on a surface of a wing section 530 may move or vibrate responsive to external forces, accelerations, or vibration proximate the surface of the wing section 530 on which the vibration detection device 515 is positioned.

In addition, responsive to instructions or commands received from a control system, one or more of the vibration detection devices 515 may transmit data associated with movements or vibration of respective coiled diaphragms, and/or the control system may receive data associated with movements or vibration of respective coiled diaphragms.

The control system may then process and analyze the received data to determine one or more properties of the movements or vibration of respective coiled diaphragms. For example, the one or more properties of the movements or vibration of respective coiled diaphragms may include frequencies, wavelengths, amplitudes, periods, phases, and/or other properties associated with vibration, waves, sinusoids, or other waveforms.

In addition, for vibration detection devices having an array of coiled diaphragms, one or more additional properties of the movements or vibration of the array of coiled diaphragms may be determined. For example, the one or more additional properties of the movements or vibration of the array of coiled diaphragms may include location, position, orientation, change in position or displacement, velocity, acceleration, and/or other properties associated with a source of the forces, accelerations, or vibration detected by the array of coiled diaphragms. In some example embodiments, the different directional sensitivity to forces, accelerations, or vibration of at least some of the coiled diaphragms in an array may enable determination of one or more additional properties of the movements or vibration, such as location, position, orientation, or other properties. In additional example embodiments, the detection of forces, accelerations, or vibration by the coiled diaphragms in an array over multiple time periods, or multiple data capture time periods, may enable determination of one or more additional properties of the movements or vibration, such as location, position, orientation, change in position or displacement, velocity, acceleration, or other properties.

Then, the determined one or more properties of the movements or vibration (including the one or more additional properties) may be compared with known, measured, or recorded properties associated with known vibration, waves, sinusoids, or other waveforms, in order to find a closest match between the detected vibration of the coiled diaphragms and a known, measured, or recorded vibration. The known, measured, or recorded properties associated with known vibration, waves, sinusoids, or other waveforms may be captured, detected, processed, and/or stored using one or more vibration detection devices positioned on surfaces of one or more objects and responsive to various forces, accelerations, or vibration associated with or proximate surfaces of the one or more objects. In example embodiments, the known vibrations and associated properties may comprise various vibration signatures and/or types, categories, or classes of vibrations and associated properties. For example, the vibration signatures and/or categories of vibrations may be associated with particular types of forces, accelerations, or vibration, such as one or more first vibration signatures associated with taps, touches, clicks, bumps, or similar types of vibration, one or more second vibration signatures associated with slides, swipes, slides, drags, or similar types of vibration, one or more third vibration signatures associated with particular speech, noises, sounds, or similar types of vibration, etc.

Based on the determined closest match of the detected vibration of the coiled diaphragms, one or more outputs may be initiated, caused, instructed, or performed. For example, a detected vibration may indicate a structural weakness, microfracture, or fatigue of a portion of the aerial vehicle, and redesign, repair, service, and/or maintenance may be instructed or performed to resolve the structural weakness. In addition, a detected vibration may indicate reduced, faulty, or abnormal operational capability of one or more components, e.g., motors, actuators, or others, and redesign, repair, service, and/or maintenance may be instructed or performed to resolve the reduced operational capability.

Further, a detected vibration may indicate adverse wind, aerodynamic, or weather conditions experienced by a portion of the aerial vehicle, and a change of heading, speed, altitude, flight plan, or other flight parameters may be instructed or performed to avoid or mitigate the adverse weather conditions. Moreover, a detected vibration may indicate contact, collision, or damage of a portion of the aerial vehicle by an external object, and a change of heading, speed, altitude, flight plan, or other flight parameters may be instructed or performed to maintain operation of the aerial vehicle, and/or inspection, repair, service, and/or maintenance may be instructed or performed to resolve the collision or damage.

Various other outputs, operations, functions, or changes may be initiated or performed based on the determined closest match of the vibration detected by the vibration detection devices.

Although FIG. 5 illustrates a particular size, shape, configuration, or arrangement of an aerial vehicle, the vibration detection devices described herein may be utilized with any other size, shape, configuration, or arrangement of aerial vehicles to capture, detect, or measure applied or external forces, accelerations, or vibration associated with portions of the aerial vehicles. Further, although the description herein generally relates to aerial vehicles, the vibration detection devices described herein may be utilized with any other types of vehicles, systems, machines, equipment, or other devices to capture, detect, or measure applied or external forces, accelerations, or vibration associated with portions of such systems or devices.

Figure 6:
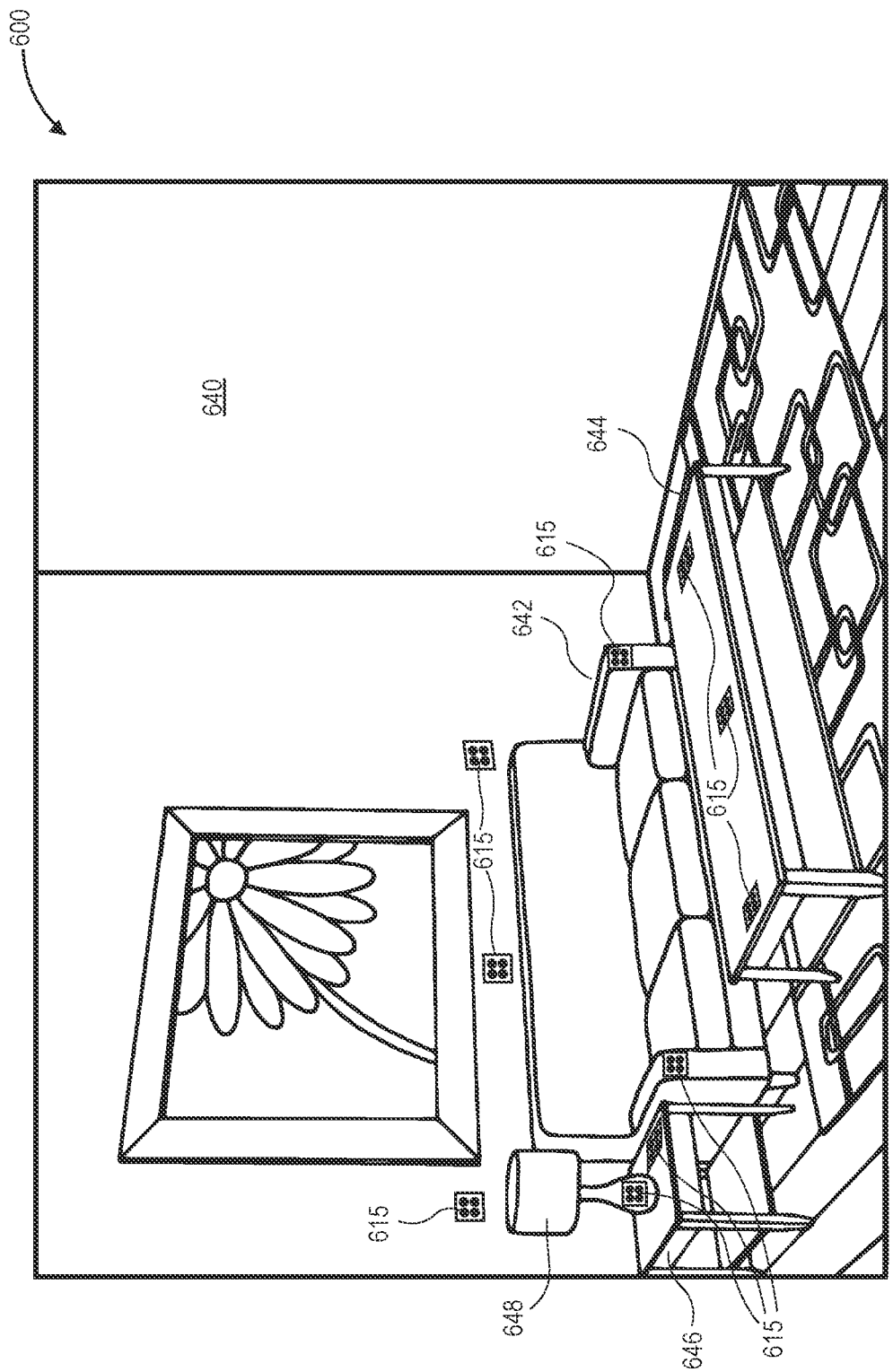
FIG. 6 is a schematic, perspective view diagram of an environment having a plurality of vibration amplification and detection devices, in accordance with implementations of the present disclosure.

FIG. 6 is a schematic, perspective view diagram 600 of an environment having a plurality of vibration amplification and detection devices, in accordance with implementations of the present disclosure.

As shown in FIG. 6, an environment 640 may include one or more walls, a floor, a ceiling, and/or one or more furniture, furnishings, or other objects. In the example illustrated in FIG. 6, the environment 640 may comprise a sitting room, living room, or family room of a home. For example, the environment 640 may include a sofa 642, a coffee table 644, a side table 646, and a lamp 648. In other example embodiments, the environment may comprise a different type of environment, such as a residence, office, store, business, warehouse, vehicle, system, machine, equipment, appliance, or other type of environment, having various other types of furniture, furnishings, or objects.

In addition, a plurality of vibration detection devices 615 may be coupled, attached, or positioned on various components or portions of the environment 640. Vibration detection devices 615 may be similar to vibration detection devices 215, 315 described herein at least with respect to FIGS. 2A-3B. In addition, the vibration detection devices 615 may include any and all of the features of vibration amplification and detection devices described herein at least with respect to FIGS. 1A-4B. For example, one or more vibration detection devices 615 may be coupled to portions of the walls of the environment 640, the sofa 642, the coffee table 644, the side table 646, and/or the lamp 648. In other example embodiments, one or more vibration detection devices 615 may be coupled, attached, or positioned on various other components or portions of the environment 640.

As described herein, each of the plurality of vibration detection devices 615 may be in communication, via wired or wireless connections, with a controller or control system. For example, responsive to instructions or commands received from a control system, one or more of the vibration detection devices 615 may be activated, e.g., one or more sensors associated with the vibration detection devices 615 may be activated to capture, detect, or measure movements or vibration of respective coiled diaphragms.

The vibration detection devices 615 may detect various applied or external forces, accelerations, or vibration associated with or proximate the surfaces on which the respective vibration detection devices 615 are positioned. For example, the coiled diaphragms of respective vibration detection devices 615 may move or vibrate responsive to forces, accelerations, or vibration, e.g., touches, taps, swipes, arcs, and/or other contacts, movements, or vibration, associated with respective surfaces on which the vibration detection devices 615 are positioned. As shown in FIG. 6, one or more coiled diaphragms of a vibration detection device 615 positioned on a surface of the coffee table 644 may move or vibrate responsive to forces, accelerations, or vibration due to contacts or movements associated with the surface of the coffee table 644 on which the vibration detection device 615 is positioned. Likewise, one or more coiled diaphragms of a vibration detection device 615 positioned on a surface of the lamp 648 may move or vibrate responsive to forces, accelerations, or vibration due to contacts or movements associated with the surface of the lamp 648 on which the vibration detection device 615 is positioned. Further, one or more coiled diaphragms of a vibration detection device 615 positioned on a surface of the sofa 642 may move or vibrate responsive to forces, accelerations, or vibration due to contacts or movements associated with the surface of the sofa 642 on which the vibration detection device 615 is positioned.

Moreover, the coiled diaphragms of respective vibration detection devices 615 may move or vibrate responsive to external or airborne forces, accelerations, or vibration, e.g., voice, speech, sounds, noise, and/or other audio signals, proximate respective surfaces on which the vibration detection devices 615 are positioned. As shown in FIG. 6, one or more coiled diaphragms of a vibration detection device 615 positioned on a surface of the walls of the environment 640 may move or vibrate responsive to external forces, accelerations, or vibration due to airborne audio signals proximate the surface of the walls of the environment 640 on which the vibration detection device 615 is positioned. Likewise, one or more coiled diaphragms of a vibration detection device 615 positioned on a surface of the side table 646 may move or vibrate responsive to external forces, accelerations, or vibration due to airborne audio signals proximate the surface of the side table 646 on which the vibration detection device 615 is positioned. Further, one or more coiled diaphragms of a vibration detection device 615 positioned on a surface of the sofa 642 may move or vibrate responsive to external forces, accelerations, or vibration due to airborne audio signals proximate the surface of the sofa 642 on which the vibration detection device 615 is positioned.

In addition, responsive to instructions or commands received from a control system, one or more of the vibration detection devices 615 may transmit data associated with movements or vibration of respective coiled diaphragms, and/or the control system may receive data associated with movements or vibration of respective coiled diaphragms.

The control system may then process and analyze the received data to determine one or more properties of the movements or vibration of respective coiled diaphragms. For example, the one or more properties of the movements or vibration of respective coiled diaphragms may include frequencies, wavelengths, amplitudes, periods, phases, and/or other properties associated with vibration, waves, sinusoids, or other waveforms.

In addition, for vibration detection devices having an array of coiled diaphragms, one or more additional properties of the movements or vibration of the array of coiled diaphragms may be determined. For example, the one or more additional properties of the movements or vibration of the array of coiled diaphragms may include location, position, orientation, change in position or displacement, velocity, acceleration, and/or other properties associated with a source of the forces, accelerations, or vibration detected by the array of coiled diaphragms. In some example embodiments, the different directional sensitivity to forces, accelerations, or vibration of at least some of the coiled diaphragms in an array may enable determination of one or more additional properties of the movements or vibration, such as location, position, orientation, or other properties. In additional example embodiments, the detection of forces, accelerations, or vibration by the coiled diaphragms in an array over multiple time periods, or multiple data capture time periods, may enable determination of one or more additional properties of the movements or vibration, such as location, position, orientation, change in position or displacement, velocity, acceleration, or other properties.

Then, the determined one or more properties of the movements or vibration (including the one or more additional properties) may be compared with known, measured, or recorded properties associated with known vibration, waves, sinusoids, or other waveforms, in order to find a closest match between the detected vibration of the coiled diaphragms and a known, measured, or recorded vibration. The known, measured, or recorded properties associated with known vibration, waves, sinusoids, or other waveforms may be captured, detected, processed, and/or stored using one or more vibration detection devices positioned on surfaces of one or more objects and responsive to various forces, accelerations, or vibration associated with or proximate surfaces of the one or more objects. In example embodiments, the known vibrations and associated properties may comprise various vibration signatures and/or types, categories, or classes of vibrations and associated properties. For example, the vibration signatures and/or categories of vibrations may be associated with particular types of forces, accelerations, or vibration, such as one or more first vibration signatures associated with taps, touches, clicks, bumps, or similar types of vibration, one or more second vibration signatures associated with slides, swipes, slides, drags, or similar types of vibration, one or more third vibration signatures associated with particular speech, noises, sounds, or similar types of vibration, etc.

Based on the determined closest match of the detected vibration of the coiled diaphragms, one or more outputs may be initiated, caused, instructed, or performed. In example embodiments, the control system may also be in communication, e.g., via local networks, WiFi networks, the Internet, or other networks, with one or more connected devices associated with the environment. Such connected devices may comprise televisions, computers, laptops, smart phones, other video input/output devices, speakers, other audio input/output devices, appliances, door entry keypads or devices, access control devices, control interfaces, touch interfaces, voice-activated devices, security cameras or devices, other computing devices, or other types of connected devices. In such example embodiments, the one or more outputs based on the determined closest match of the detected vibration may initiate, cause, or instruct one or more operations or functions of various connected devices, such that the vibration detection devices associated with the environment may act as input devices, input interfaces, or remote controls, to control, instruct, or command the various connected devices.

For example, a detected vibration may be associated with a tap, click, or touch motion on a surface, and a particular operation or function of a connected device, such as turning on or off, pausing, restarting, or other operations, e.g., of a television, lamp, computer, speaker, or appliance, may be initiated or instructed. In addition, a detected vibration may be associated with a swipe, drag, or sliding motion on a surface, and a particular operation or function of a connected device, such as adjusting volume, brightness, or other characteristics, e.g., of a television, lamp, computer, speaker, or appliance, may be initiated or instructed. Further, a detected vibration may be associated with a circling or arcing motion on a surface, and a particular operation or function of a connected device, such as rewinding, fast forwarding, skipping, or other operations, e.g., of a television, computer, speaker, or appliance, may be initiated or instructed. Various other types of vibration may be detected in addition to touches, clicks, taps, swipes, slides, circles, arcs, other contacts, movements, or vibration, and/or combinations thereof.

Further, various detected vibrations may be associated with particular voice commands to initiate, cause, or instruct various operations of one or more connected devices. For example, the various detected vibrations may be associated with external or airborne forces, accelerations, or vibration, e.g., voice, speech, sounds, noise, and/or other audio signals, proximate respective surfaces on which vibration detection devices are positioned. Based on such detected vibrations that are associated with particular voice commands, the control system may initiate, cause, or instruct corresponding operations or functions of one or more connected devices.

Various other outputs, operations, functions, or changes may be initiated or performed based on the determined closest match of the vibration detected by the vibration detection devices.

Although FIG. 6 illustrates a particular size, shape, configuration, or arrangement of an environment, the vibration detection devices described herein may be utilized with any other size, shape, configuration, or arrangement of environments to capture, detect, or measure applied or external forces, accelerations, or vibration associated with portions of the environments. Further, although the description herein generally relates to vibration detection devices within a home or residence, the vibration detection devices described herein may be utilized with any other types of environments, e.g., residences, offices, stores, businesses, warehouses, vehicles, systems, machines, equipment, appliances, or other types of environments, to capture, detect, or measure applied or external forces, accelerations, or vibration associated with portions of such environments, as well as to initiate, cause, or instruct one or more operations or functions of various types of connected devices, e.g., televisions, computers, laptops, smart phones, other video input/output devices, speakers, other audio input/output devices, appliances, door entry keypads or devices, access control devices, control interfaces, touch interfaces, voice-activated devices, security cameras or devices, other computing devices, or other types of connected devices.

Figure 7:
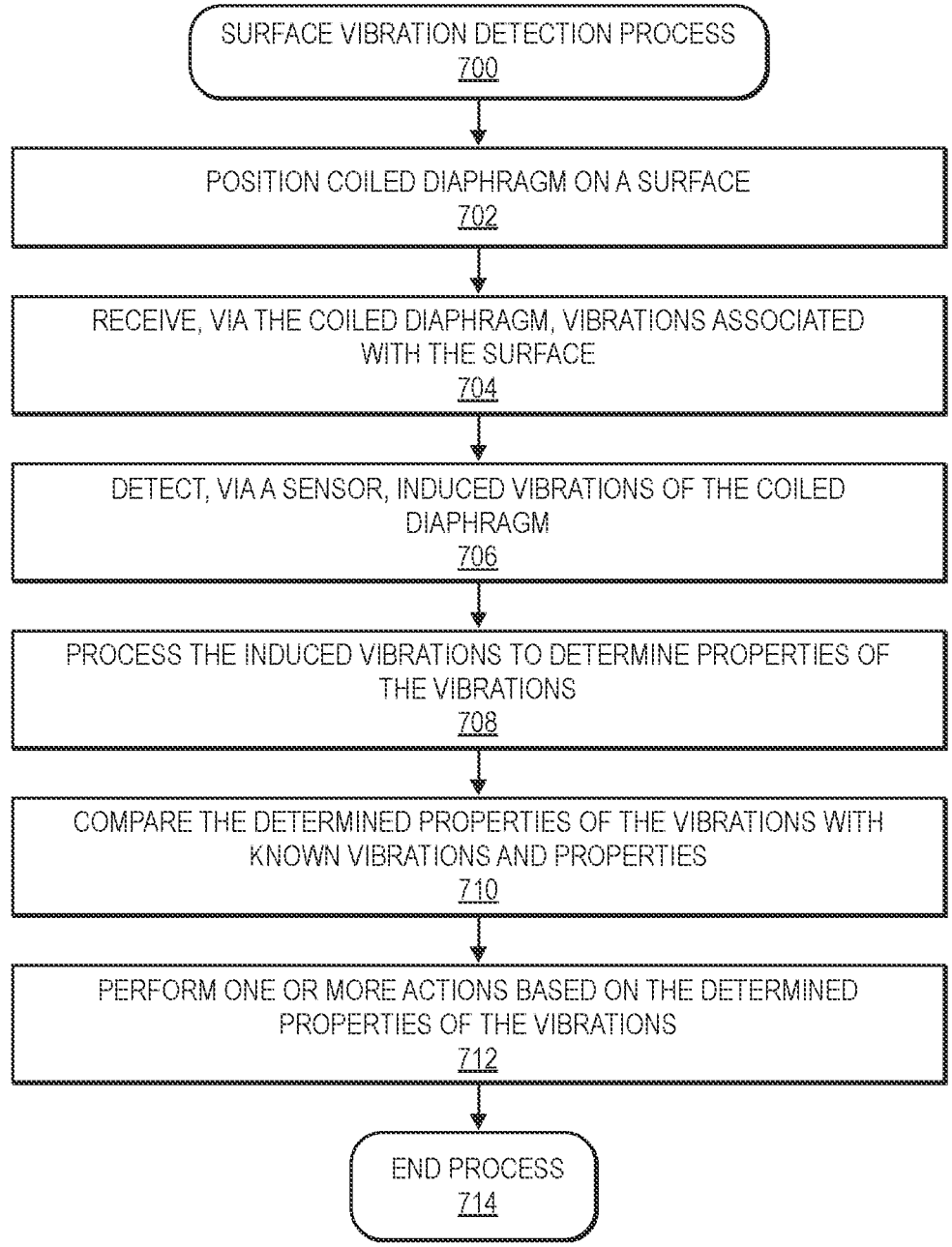
FIG. 7 is a flow diagram illustrating an example surface vibration detection process, in accordance with implementations of the present disclosure.

FIG. 7 is a flow diagram illustrating an example surface vibration detection process 700, in accordance with implementations of the present disclosure.

The process 700 may begin by positioning a coiled diaphragm on a surface, as at 702. For example, a vibration detection device including one or more coiled diaphragms may be placed, coupled, adhered, or otherwise positioned on a surface of an object, such as a vehicle, machine, equipment, system, device, or other object. As described herein, the one or more coiled diaphragms may include respective one or more axles, fulcrum discs, pins, and/or substrates, and the one or more coiled diaphragms may be coupled to the surface via respective substrates. Further, the vibration detection device may include one or more sensors configured to capture, detect, or measure movements or vibration of the one or more coiled diaphragms responsive to vibration associated with or proximate the surface on which the vibration detection device is positioned. Moreover, a control system may instruct or command placement or positioning of the vibration detection device on a surface of an object.

The process 700 may continue by receiving, via the coiled diaphragm, vibrations associated with the surface, as at 704. For example, external or applied forces, accelerations, and/or vibration associated with the surface may be received and/or amplified by the one or more coiled diaphragms. As described herein, the external or applied forces, accelerations, and/or vibration associated with the surface may be caused by structural vibration of the surface of the object, vibration due to operation of one or more motors, actuators, or other components of the object, vibration due to external factors such as wind, aerodynamic forces, or other external forces, and/or other sources of vibration. Further, various waves, sinusoids, or other waveforms may be received and amplified by the one or more coiled diaphragms responsive to the external or applied forces, accelerations, and/or vibration associated with the surface of the object. Moreover, a control system may instruct or command placement or positioning of the vibration detection device on a surface of an object to receive vibrations associated with the surface.

The process 700 may proceed by detecting, via a sensor, induced vibrations of the coiled diaphragm, as at 706. For example, one or more sensors may capture, detect, or measure the vibrations that are received and amplified by the one or more coiled diaphragms. As described herein, the one or more sensors may comprise imaging devices, imaging sensors, cameras, other similar optical capture devices, line scanners, laser line scanners, other similar optical scanner devices, optical displacement sensors, laser-based displacement sensors, capacitive sensors, other similar distance or displacement sensors, microphones, audio transducers, or other similar audio sensors. Further, the one or more sensors may capture or detect various waves, sinusoids, or other waveforms that may be received and amplified by the one or more coiled diaphragms responsive to the external or applied forces, accelerations, and/or vibration associated with the surface of the object. Moreover, a control system may instruct or command detection, by the one or more sensors, of induced vibrations associated with the surface of the object.

The process 700 may continue to process the induced vibrations to determine properties of the vibrations, as at 708. For example, the data captured or detected by the one or more sensors may be transmitted to, and/or received by, a control system to process and analyze the data. The control system may process or analyze the data associated with various waves, sinusoids, or other waveforms that may be received and amplified by the one or more coiled diaphragms responsive to the external or applied forces, accelerations, and/or vibration associated with the surface of the object. Based on the processing, the control system may determine various properties of the induced vibrations, such as frequencies, wavelengths, amplitudes, periods, phases, and/or other properties associated with vibration, waves, sinusoids, or other waveforms. Various signal processing algorithms may be used by the control system to process, analyze, and determine various properties associated with the induced vibrations of the coiled diaphragms.

The process 700 may proceed to compare the determined properties of the vibrations with known vibrations and properties, as at 710. For example, the known vibrations and associated properties may be generated, recorded, and/or stored based on applications of known waveforms to the surface of the object, and/or based on prior operations, testing, and/or analysis of an object, such as a vehicle, machine, equipment, or other system. As described herein, the known vibrations and associated properties may comprise various vibration signatures and/or types, categories, or classes of vibrations and associated properties. Then, the induced vibrations and determined properties of the waveforms associated with the surface of the object captured or detected by the one or more sensors of the vibration detection device may be compared with the known vibrations and associated properties to determine a closest match therebetween. Various data processing and comparison algorithms may be used by the control system to process, analyze, and determine a closest match between the various properties associated with the induced vibrations of the coiled diaphragms and known vibrations and associated properties.

The process 700 may then continue with performing one or more actions based on the determined properties of the vibrations, as at 712. For example, responsive to identifying a closest match between induced vibrations and properties associated with a surface of an object and known vibrations and associated properties, one or more actions may be initiated, caused, instructed, and/or performed. As described herein, the closest match between induced vibrations and known vibrations may indicate structural changes to portions of the object, functional or operational changes to components of the object, external or environmental changes associated with the object, inputs, instructions, or commands associated with one or more connected devices, and/or other types of inputs, changes, or vibrations. In addition, the one or more actions may include identifying structural properties associated with the surface of the object, identifying properties associated with one or more components of the object, initiating changes to operations of the object, instructing service, repair, or maintenance for the object, instructing or commanding various functions or operations of one or more connected devices, and/or various other types of actions. Moreover, a control system may instruct or command the one or more actions based on the determined properties of the vibrations associated with the surface of the object.

The process 700 may then end, as at 714.

Figure 8:
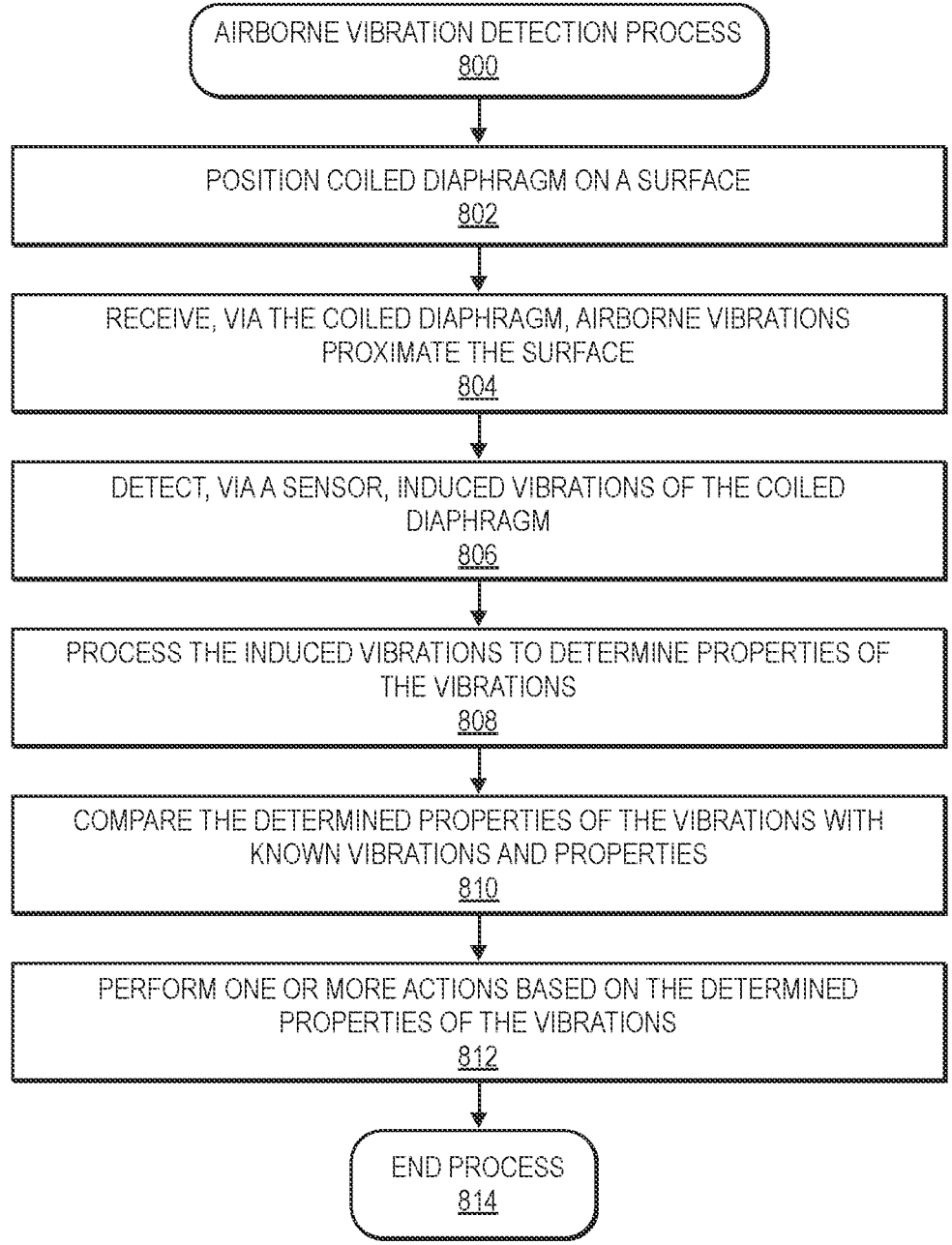
FIG. 8 is a flow diagram illustrating an example airborne vibration detection process, in accordance with implementations of the present disclosure.

FIG. 8 is a flow diagram illustrating an example airborne vibration detection process 800, in accordance with implementations of the present disclosure.

The process 800 may begin by positioning a coiled diaphragm on a surface, as at 802. For example, a vibration detection device including one or more coiled diaphragms may be placed, coupled, adhered, or otherwise positioned on a surface of an object, such as a vehicle, machine, equipment, system, device, or other object. As described herein, the one or more coiled diaphragms may include respective one or more axles, fulcrum discs, pins, and/or substrates, and the one or more coiled diaphragms may be coupled to the surface via respective substrates. Further, the vibration detection device may include one or more sensors configured to capture, detect, or measure movements or vibration of the one or more coiled diaphragms responsive to vibration associated with or proximate the surface on which the vibration detection device is positioned. Moreover, a control system may instruct or command placement or positioning of the vibration detection device on a surface of an object.

The process 800 may continue by receiving, via the coiled diaphragm, airborne vibrations proximate the surface, as at 804. For example, airborne external or applied forces, accelerations, and/or vibration proximate the surface may be received and/or amplified by the one or more coiled diaphragms. As described herein, the airborne external or applied forces, accelerations, and/or vibration proximate the surface may be caused by structural vibration of portions of the object, vibration due to operation of one or more motors, actuators, or other components of the object, vibration due to external factors such as wind, aerodynamic forces, or other external forces, voice, sound, and/or noise inputs or waves, and/or other sources of vibration. Further, various waves, sinusoids, or other waveforms may be received and amplified by the one or more coiled diaphragms responsive to the airborne external or applied forces, accelerations, and/or vibration proximate the surface of the object. Moreover, a control system may instruct or command placement or positioning of the vibration detection device on a surface of an object to receive vibrations proximate the surface.

The process 800 may proceed by detecting, via a sensor, induced vibrations of the coiled diaphragm, as at 806. For example, one or more sensors may capture, detect, or measure the vibrations that are received and amplified by the one or more coiled diaphragms. As described herein, the one or more sensors may comprise imaging devices, imaging sensors, cameras, other similar optical capture devices, line scanners, laser line scanners, other similar optical scanner devices, optical displacement sensors, laser-based displacement sensors, capacitive sensors, other similar distance or displacement sensors, microphones, audio transducers, or other similar audio sensors. Further, the one or more sensors may capture or detect various waves, sinusoids, or other waveforms that may be received and amplified by the one or more coiled diaphragms responsive to the airborne external or applied forces, accelerations, and/or vibration proximate the surface of the object. Moreover, a control system may instruct or command detection, by the one or more sensors, of induced vibrations proximate the surface of the object.

The process 800 may continue to process the induced vibrations to determine properties of the vibrations, as at 808. For example, the data captured or detected by the one or more sensors may be transmitted to, and/or received by, a control system to process and analyze the data. The control system may process or analyze the data associated with various waves, sinusoids, or other waveforms that may be received and amplified by the one or more coiled diaphragms responsive to the airborne external or applied forces, accelerations, and/or vibration proximate the surface of the object. Based on the processing, the control system may determine various properties of the induced vibrations, such as frequencies, wavelengths, amplitudes, periods, phases, and/or other properties associated with vibration, waves, sinusoids, or other waveforms. Various signal processing algorithms may be used by the control system to process, analyze, and determine various properties associated with the induced vibrations of the coiled diaphragms.

The process 800 may proceed to compare the determined properties of the vibrations with known vibrations and properties, as at 810. For example, the known vibrations and associated properties may be generated, recorded, and/or stored based on applications of known waveforms proximate the surface of the object, and/or based on prior operations, testing, and/or analysis of an object, such as a vehicle, machine, equipment, or other system. As described herein, the known vibrations and associated properties may comprise various vibration signatures and/or types, categories, or classes of vibrations and associated properties. Then, the induced vibrations and determined properties of the waveforms proximate the surface of the object captured or detected by the one or more sensors of the vibration detection device may be compared with the known vibrations and associated properties to determine a closest match therebetween. Various data processing and comparison algorithms may be used by the control system to process, analyze, and determine a closest match between the various properties associated with the induced vibrations of the coiled diaphragms and known vibrations and associated properties.

The process 800 may then continue with performing one or more actions based on the determined properties of the vibrations, as at 812. For example, responsive to identifying a closest match between induced vibrations and properties proximate a surface of an object and known vibrations and associated properties, one or more actions may be initiated, caused, instructed, and/or performed. As described herein, the closest match between induced vibrations and known vibrations may indicate structural changes to portions of the object, functional or operational changes to components of the object, airborne external or environmental changes associated with the object, voice, sound, and/or noise inputs, instructions, or commands associated with one or more connected devices, and/or other types of inputs, changes, or vibrations. In addition, the one or more actions may include identifying structural properties associated with the surface of the object, identifying properties associated with one or more components of the object, initiating changes to operations of the object, instructing service, repair, or maintenance for the object, instructing or commanding various functions or operations of one or more connected devices, and/or various other types of actions. Moreover, a control system may instruct or command the one or more actions based on the determined properties of the vibrations proximate the surface of the object.

The process 800 may then end, as at 814.

FIG. 9 is a block diagram illustrating an example control system 900, in accordance with implementations of the present disclosure.

Various operations of a control system or controller, such as those described herein, may be executed on one or more computer systems, and/or interacting with various other computers, systems, or devices in an environment, according to various implementations. For example, the control system or controller discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of vibration amplification and detection systems, operations, or processes, etc.) may be implemented via one or more nodes of the control system 900 that are distinct from those nodes implementing other data sources or services (e.g., related to other portions of vibration amplification and detection systems, operations, or processes, etc.).

In various implementations, the control system 900 may be a uniprocessor system including one processor 910A, or a multiprocessor system including several processors 910A-910N (e.g., two, four, eight, or another suitable number).

The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, vehicles, machines, equipment, systems, devices, other objects, other computer systems, testing apparatus or equipment, data processing systems, various types of sensors, various connected devices, and/or between nodes of the control system 900. In various implementations, the network interface 940 may support communication via wired or wireless general data networks, such as any suitable type of Ethernet network.

Input/output devices 950 may, in some implementations, include one or more displays, video input/output devices, microphones, speakers, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate capture, detection, or measurement of movement or vibration data, processing and analysis of movement or vibration data, comparison of movement and vibration data with known vibration data, initiation, instruction, or command of various actions based on movement or vibration data, etc. The data storage 935 may include various data stores for maintaining data related to systems, operations, or processes described herein, such as vibration detection devices, coiled diaphragms, axles, fulcrum discs, pins, substrates, sensors, vehicles, machines, equipment, systems, devices, objects, surfaces of objects, structural data, operational data, external or environment data, force, acceleration, or vibration input data, voice, sound, or noise input data, known vibration data and associated properties, connected devices, initiation, instruction, or command data, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7 and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A vibration amplification and detection device, comprising:
   a flat, coiled diaphragm;
   an axle coupled to a center of the diaphragm;
   a fulcrum disc coupled to a center of the axle;
   a pin coupled to a center of the fulcrum disc at a first end of the pin;
   a substrate coupled to a second end of the pin; and
   a sensor positioned to detect vibration of the diaphragm.

2. The vibration amplification and detection device of claim 1, wherein the flat, coiled diaphragm is approximately 0.4 mm in thickness, and between approximately 1.0 cm and approximately 2.0 cm in diameter.

3. The vibration amplification and detection device of claim 1, wherein the flat, coiled diaphragm has a circular shape.

4. The vibration amplification and detection device of claim 1, wherein responsive to vibration of the diaphragm, respective portions of the flat, coiled diaphragm are configured to move relative to each other.

5. A vibration detection device, comprising:
   a coiled diaphragm;
   at least one axle coupled to a center of the diaphragm;
   a pin coupled to the center of the diaphragm at a first end of the pin via the at least one axle; and
   a substrate coupled to a second end of the pin;
   wherein the at least one axle extends in a first direction with respect to the diaphragm, and the diaphragm is configured to receive vibrations in a direction orthogonal to the first direction.

6. The vibration detection device of claim 5, wherein the coiled diaphragm is configured as a flat disc.

7. The vibration detection device of claim 5, wherein the coiled diaphragm is approximately radially symmetrical about the pin, and has at least one of a circular shape, an oval shape, a square shape, a pentagonal shape, a hexagonal shape, or an octagonal shape.

8. The vibration detection device of claim 5, further comprising:
   a fulcrum disc coupled to a center of the at least one axle;
   wherein the pin is further coupled to the center of the diaphragm at the first end of the pin via the fulcrum disc.

9. The vibration detection device of claim 5, wherein the at least one axle comprises a first axle extending in the first direction with respect to the diaphragm and a second axle extending in a second direction with respect to the diaphragm.

10. The vibration detection device of claim 9, wherein the first direction is approximately orthogonal to the second direction.

11. The vibration detection device of claim 5, further comprising:
a sensor positioned to detect vibration of the diaphragm;
wherein the sensor comprises at least one of an imaging device, a line scanner, a laser-based displacement sensor, an optical displacement sensor, a capacitive sensor, or an audio sensor.

12. The vibration detection device of claim 11, further comprising:
a control system configured to at least:
receive, from the sensor, data associated with detected vibration of the diaphragm;
process the detected vibration to determine at least one property of the detected vibration; and
instruct at least one output based at least in part on the at least one property of the detected vibration.

13. The vibration detection device of claim 5, wherein the vibration detection device comprises a plurality of coiled diaphragms coupled to the substrate via respective pins.

14. The vibration detection device of claim 13, wherein the plurality of coiled diaphragms are arranged on at least one of a plurality of layers, or a plurality of faces of the substrate.

15. A vibration detection device of claim 13, comprising:
a coiled diaphragm;
a pin coupled to a center of the diaphragm at a first end of the pin; and
a substrate coupled to a second end of the pin;
wherein the vibration detection device comprises a plurality of coiled diaphragms coupled to the substrate via respective pins;
wherein individual ones of the plurality of coiled diaphragms include respective axles, wherein respective axles of at least some of the plurality of coiled diaphragms are oriented in different directions from each other.

16. A method to detect vibrations, comprising:
receiving, by a control system and from a sensor associated with a vibration detection device, data associated with vibration of a coiled diaphragm, the vibration detection device being positioned on a surface, and the vibration detection device comprising the coiled diaphragm, at least one axle coupled to a center of the diaphragm, a pin coupled to the center of the diaphragm at a first end of the pin via the at least one axle, and a substrate coupled to a second end of the pin, wherein the at least one axle extends in a first direction with respect to the diaphragm, and the diaphragm is configured to receive vibrations in a direction orthogonal to the first direction;
processing, by the control system, the data associated with vibration of the diaphragm to determine at least one property of the vibration; and
instructing, by the control system, at least one output based at least in part on the at least one property of the vibration.

17. The method of claim 16, wherein receiving data associated with vibration of the diaphragm comprises receiving at least one of data associated with vibration of the surface on which the vibration detection device is positioned, or data associated with airborne vibration proximate the surface on which the vibration detection device is positioned.

18. The method of claim 16, wherein the at least one property of the vibration comprises at least one of a frequency, wavelength, amplitude, period, or phase of the vibration.

19. The method of claim 16, wherein the at least one property of the vibration comprises at least one of a position, velocity, or acceleration associated with a source of the vibration relative to the coiled diaphragm.

20. The method of claim 16, wherein instructing at least one output comprises instructing at least one function of a connected device based at least in part on the at least one property of the vibration.

* * * * *